US008355169B2

(12) United States Patent
Hersch et al.

(10) Patent No.: US 8,355,169 B2
(45) Date of Patent: Jan. 15, 2013

(54) SYNTHESIS OF AUTHENTICABLE LUMINESCENT COLOR HALFTONE IMAGES

(75) Inventors: Roger D. Hersch, Epalinges (CH); Romain Rossier, Lausanne (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 403 days.

(21) Appl. No.: 12/805,872

(22) Filed: Aug. 23, 2010

(65) Prior Publication Data
US 2012/0043751 A1 Feb. 23, 2012

(51) Int. Cl.
*G06F 15/00* (2006.01)
*B42D 15/00* (2006.01)
(52) U.S. Cl. .......................... 358/1.9; 283/92
(58) Field of Classification Search ................ None
See application file for complete search history.

(56) References Cited

U.S. PATENT DOCUMENTS

| | | | |
|---|---|---|---|
| 5,317,426 A | 5/1994 | Hoshino | |
| 6,718,046 B2 * | 4/2004 | Reed et al. | 382/100 |
| 6,993,154 B2 * | 1/2006 | Brunk | 382/100 |
| 7,005,166 B2 | 2/2006 | Narita et al. | |
| 7,054,038 B1 | 5/2006 | Ostroumoukhov et al. | |
| 7,213,757 B2 * | 5/2007 | Jones et al. | 235/462.01 |
| 7,357,326 B2 | 4/2008 | Hattersley et al. | |
| 7,379,205 B2 | 5/2008 | Auslander et al. | |
| 7,422,158 B2 | 9/2008 | Auslander et al. | |
| 7,536,553 B2 | 5/2009 | Auslander et al. | |
| 8,085,438 B2 * | 12/2011 | Hersch et al. | 358/3.09 |
| 2005/0068550 A1 * | 3/2005 | Braun | 358/1.9 |
| 2007/0264476 A1 * | 11/2007 | Bala et al. | 428/195.1 |
| 2010/0157377 A1 * | 6/2010 | Zhao et al. | 358/3.28 |

OTHER PUBLICATIONS

U.S. Appl. No. 10/818,058, filed Apr. 4, 2003, Coyle, W. J. and Smith, J. C.
U.S. Appl. No. 11/785,931, filed Apr. 23, 2007, Hersch, R.D., Donzé P., and Chosson, S.M.
U.S. Appl. No. 10/517,299, filed Jun. 7, 2002, Jones, G. II, Burke S. and McDonald P.
U.S. Appl. No. 10/482,892, filed Jul. 25, 2001, Brehm L. and Erbar H.
Balasubramanian, R., 1999, Optimization of the spectral Neugebauer model for printer characterization, J. of Electronic Imaging, vol. 8, No. 2, 156-166.
Bugnon, M. Brichon, R.D. Hersch, Simplified Ink Spreading Equations for CMYK Halftone Prints, Proc. SPIE Color Imaging XIII: Processing, Hardcopy, and Applications, vol. 6807, Jan. 2008, paper 680717, pp. 1-12.

(Continued)

*Primary Examiner* — Twyler Haskins
*Assistant Examiner* — Henok Shiferaw

(57) ABSTRACT

The present invention enables creating authenticable multi-ink luminescent continuous tone color halftone images offering means of verifying their authenticity. The invented luminescent color halftone image synthesizing techniques enable increasing the attractiveness and aesthetics of color images. The invention relies on daylight luminescent inks, color prediction models for daylight luminescent halftones, color gamuts of luminescent and non-luminescent inks, color separation into luminescent and non-luminescent ink layers, mapping of input gamuts into a luminescent target gamuts by gamut reduction and/or expansion strategies, and luminescent color halftone image generation. The basic authentication is performed by examining the excitation trace image of the synthesized luminescent color halftone image under an illuminant active within its excitation wavelength range. Further authentication means include hiding messages under one or several different illuminants as well as hiding message with different sets of luminescent inks. Hidden messages are recovered under illuminants different from their reference illuminant.

30 Claims, 17 Drawing Sheets

OTHER PUBLICATIONS

T. Cholewo, S. Love, Gamut boundary determination using alpha-shapes, Proc. IS&T $7^{th}$ Imaging Conf., pp. 200-204, 1999.

Hains, C., Wang, S.-G. and Knox, K., 2003, Chapter 6, Digital color halftones, In Sharma, G., Digital Color Imaging Handbook, CRC Press, 2003, 385-490.

R.D. Hersch, P. Emmel, F. Collaud, F. Crété, Spectral reflection and dot surface prediction models for color halftone prints, Journal of Electronic Imaging, vol. 14, No. 3, 2005, article 33001, pp. 1-12.

R.D. Hersch, F. Crété. Improving the Yule-Nielsen modified spectral Neugebauer model by dot surface coverages depending on the ink superposition conditions, Color Imaging X: Processing, Hardcopy and Applications, Proc SPIE 5667, 2005, pp. 434-445.

T. Morioka, Y. Azumi and M. Inui, "A psychophysical evaluation of a gamut expansion algorithm based on chroma mapping", published in Proc. International Conference on Digital Printing Technologies (NIP 21), Baltimore, USA, 2005, pp. 433-436.

Romain Rossier and Roger D. Hersch, "Ink-dependent n-factors for the Yule-Nielsen modified spectral Neugebauer model," Proc. 5th European Conference on Colour in Graphics, Imaging, and Vision (CGIV 2010), Joensuu, Finland, pp. 202-206.

R. Rossier and R.D. Hersch, "Introducing ink spreading within the cellular Yule-Nielsen modified Neugebauer model", to be published on the 7th of Nov. 2010 at the 18th Color Imaging Conference.

Sharma, G., 2003, Chapter 1, Sections 1.5 to 1.7, Color fundamentals for digital imaging, In Sharma, G., Digital Color Imaging Handbook, CRC Press, 2003, 15-40.

Wyble, D.R., Berns, R.S, 2000, A Critical Review of Spectral Models Applied to Binary Color Printing, Journal of Color Research and Application vol. 25, No. 1, 4-19.

R. Bala, Chapter 5, Device Characterization, Section 5.4.5. Lattice-based interpolation, in Digital Color Imaging Handbook, (Ed. G. Sharma), pp. 301-304, CRC Press, 2003.

\* cited by examiner

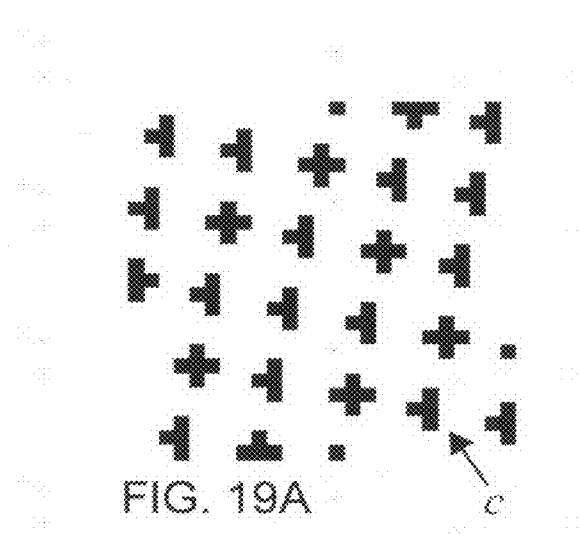
FIG. 19A $c$
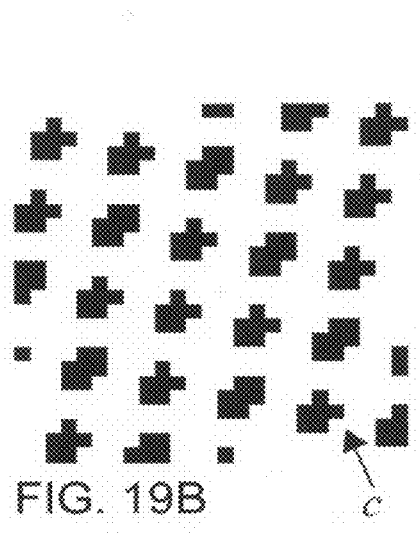
FIG. 19B $c'$
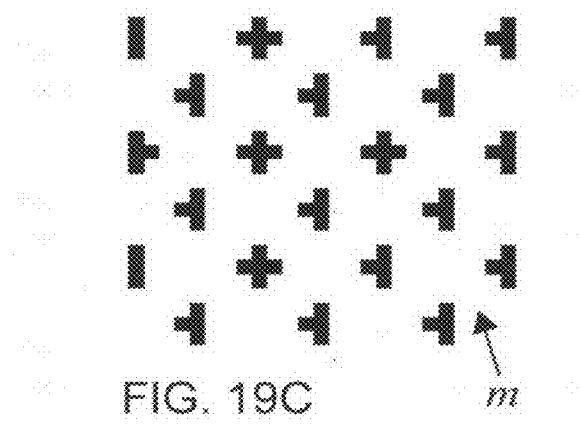
FIG. 19C $m$
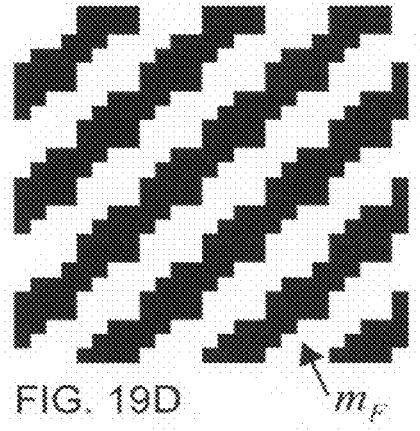
FIG. 19D $m_F$
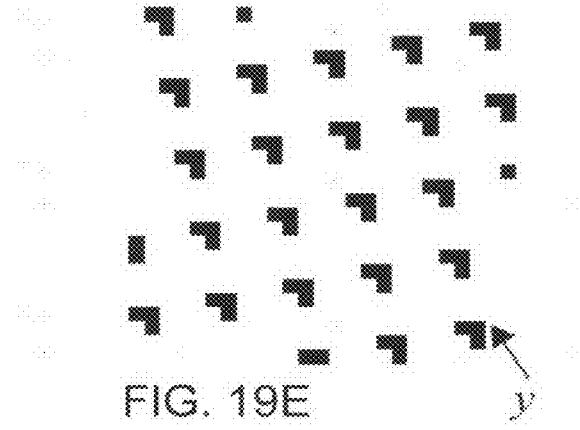
FIG. 19E $y$
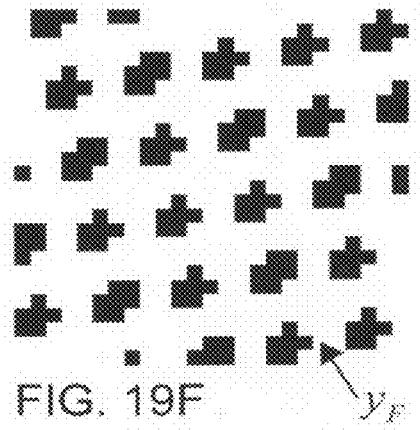
FIG. 19F $y_F$

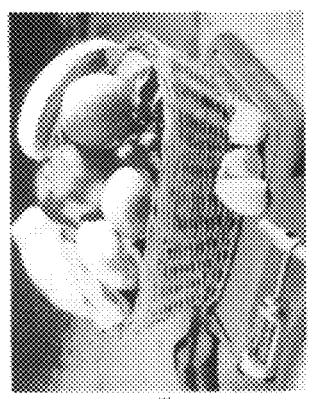
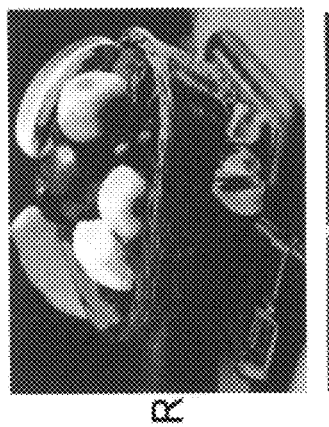
FIG. 21B
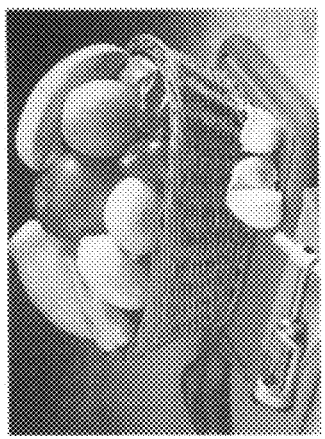
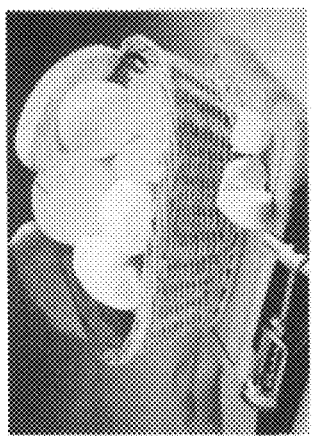
FIG. 21A
FIG. 20A
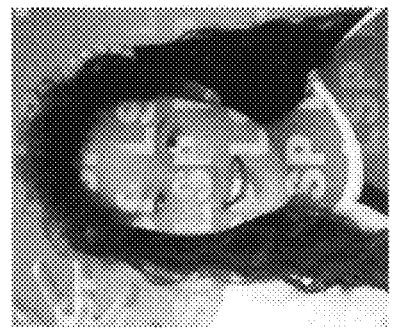
FIG. 20B

SYNTHESIS OF AUTHENTICABLE LUMINESCENT COLOR HALFTONE IMAGES

BACKGROUND

The present invention proposes techniques for creating multi-ink luminescent color halftone images with means of verifying their authenticity. In addition, the invented luminescent color halftone image synthesizing techniques enable increasing the attractiveness and aesthetics of color images.

Providing new authenticating techniques coupled with corresponding design tools is of high importance, since existing documents and valuable products are often counterfeited due to the availability of high-quality and low-priced color photocopiers, desktop scanners, color printers and image processing software.

These new authenticating and design capabilities rely on the extended gamut and the strong luminescent colors offered by the invented methods for creating color images with combinations of classical and of daylight luminescent inks. The presence of a luminescent image part, verified by using an illuminant different from a reference illuminant (e.g. a UV light source, a colored light source, or a white light source different from the reference illuminant) validates the authenticity of the document, respectively product. Security documents such as banknotes, checks, credit cards, identity cards, travel documents, business documents, diploma as well as medical drug packages, commercial art and fashion articles may benefit from the enhanced security and the new design features provided by color separations into classical non-luminescent and daylight luminescent inks.

A further application concerns valuable products where protective and decorative features can be combined. For example luxury goods such as watches and clocks, bottles of expensive liquids (perfumes, body care liquids, alcoholic drinks), clothes (e.g. dresses, skirts, blouses, jackets and pants), pieces of art (paintings) may show under normal daylight light striking luminescent color images and at the same time prevent counterfeits by making the unauthorized reproduction of such luminescent color images difficult to achieve with commercially available desktop scanners and printers.

The present invention relies on the synthesis of color images with daylight luminescent inks. Until now, daylight luminescent colors were mostly used within fluorescent markers and for painting purposes. Slightly fluorescent inks have been used in the past by the print industry for increasing the saturation of an ink, for example the magenta ink. Daylight luminescent inks produce, when seen under daylight, saturated and intense colors since part of the energy absorbed at excitation wavelengths within the UV and the visible wavelength ranges is reemitted by luminescence within the visible wavelength range. Since daylight luminescent inks absorb energy in the visible wavelength range, they cannot be additively mixed, such as for example fluorescent inks that are invisible under daylight and possibly create non-interfering emission colors under UV light. In addition, since for most daylight luminescent inks, energy is also absorbed in the UV excitation wavelength range, daylight luminescent inks form, thanks to their emission spectra, also visible colors, when seen under a UV illumination (also called "black light").

The term "luminescence" encompasses both the de-excitation of molecules by fluorescent emission, where the lifetime of an exited molecule ranges between $10^{-10}$ s to $10^{-7}$ s and slower radiative emission de-excitation processes, where the lifetime of the excited state of molecules ranges between $10^{-7}$ s to several seconds. The terms "UV illumination", "UV illuminant" or "UV light" mean that the illuminant emits within the UV wavelength range, between 150 nm and 400 nm. Commercially available UV lamps, also called blacklight lamps, have peaks at 254 nm (UVC wavelength range), 311 or 313 nm (UVB wavelength range) or at 365 nm (UVA wavelength range).

Throughout the present disclosure, we refer to the CIE-XYZ and the CIELAB colorimetric systems (see Color fundamentals for digital imaging, in Digital Color Imaging Handbook, Sharma G. Ed., Chap. 1, Sections 1.5 to 1.7, pp. 15-40, CRC Press, 2003, herein incorporated by reference, and denoted [Sharma 2003]). In the present disclosure, the L*, a*, b* coordinates, as well as the chroma C* and the hue h* of the CIELAB colorimetric system are written without the star, i.e. respectively L, a, b, C, h.

There were prior art attempts to create color images by using several luminescent inks each emitting in a different part of the visible wavelength range. U.S. Pat. No. 7,054,038, Method and apparatus for generating digital halftone images by multi color dithering, filed Jan. 4, 2000, to Ostromoukhov and Hersch (also inventor in the present patent application), teaches a multi-color dithering method where one or more inks are possibly fluorescent inks. However, since the teachings of that patent are limited to juxtaposed halftones, i.e. side by side printed surfaces of fluorescent and non-fluorescent inks, it cannot be applied to today's mainstream screening technologies, such as mutually rotated clustered dots, where ink dots do partially overlap. In addition, juxtaposed halftoning requires a high registration accuracy which is difficult or impossible to achieve on high-throughput and/or on large size printing systems (offset, gravure, flexo, serigraphy).

In several inventions, fluorescent inks which are invisible when seen under normal daylight are used to check the authenticity of documents under UV light. U.S. patent application Ser. No. 10/818,058, "Methods and ink compositions for invisibly printed security images having multiple authentication features", to Coyle, W. J. and Smith, J. C, filed Apr. 5, 2004, proposes to create fluorescent color images with red, green and blue emitting fluorescent inks, which are invisible under day light. U.S. Pat. No. 7,005,166, "Method for fluorescent image formation, print produced thereby and thermal transfer sheet thereof," to Narita and Eto (2002), teaches how to form an image with color gradations using fluorescent red, green and blue colorants, colorless under normal daylight and emitting fluorescence under UV illumination. U.S. patent application Ser. No. 10/482,892 "Halftone image produced by printing", inventors Brehm L. and Erbar H., priority Jul. 25, 2001, also describes an additive fluorescent ink mixing process capable of creating continuous tone halftone images. However, since the proposed halftoning process is additive, it can only be applied to inks which to do not absorb in the visible wavelength range, i.e. to substantially invisible fluorescent inks.

U.S. patent application Ser. No. 11/785,931, "Printing color images visible under UV light on security documents and valuable articles", filed 23 Apr. 2007 to Hersch (also inventor in present application), Donzé and Chosson (hereinafter: "Hersch, Donzé, Chosson 2007") teaches a method for printing full color images invisible under daylight and visible under UV illumination with fluorescent inks which may have emission colors different from red, green and blue.

A fluorescent or luminescent optical symbol scanner is disclosed in U.S. Pat. No. 7,357,326, filed Nov. 30, 2005 to Hattersley and Blackwell III, relying on a light emitting diode illuminating in the visible spectrum at a first wavelength, and a filter and sensor for capturing light at a second wavelength.

The presence of light at the second wavelength enables reading fluorescent or luminescent markings.

U.S. patent application Ser. No. 10/517,299, "System and methods for product and document authentication", filed Jun. 7, 2002 to G. Jones II, S. Burke and P. McDonald describes a method of marking products by tags formed by luminescent inks having specific emission wavelength ranges and specific decay times.

U.S. Pat. No. 7,422,158, Fluorescent hidden indicium, filed Oct. 24, 2003 to Auslander and Cordery propose a print head system with a first ink having a first color under normal daylight and a second fluorescent ink having the same color as the first ink under normal daylight but discernible from the first ink when subjected to fluorescent-exciting radiation. This second ink visible only under a fluorescence exciting radiation enables creating covert markings. U.S. Pat. No. 7,379,205 "System and method for embedding and extracting key information" to J. D. Auslander et. al, filed 16 of Dec. 2003 adds the possibility of revealing key information by the second fluorescent ink under fluorescent exciting light.

U.S. Pat. No. 7,182,451 "Method and apparatus for halftone printing with multi-signal transmission ink" to J. D. Auslander, filed 24 of Oct. 2003, teaches a method for reducing the amount of a single printed fluorescent ink by using single ink halftoning without reducing the intensity of the emitted fluorescent signal in the same proportion.

U.S. Pat. No. 7,536,553 "Method and system for validating a security marking" to J. D. Auslander, R. A. Cordery and C. Zeller, filed 24 Apr. 2002, teaches a method for printing a security marking with an ink absorbing light under daylight (dark patterns) and emitting light under an excitation illumination. This security marking is viewed both under daylight and by fluorescence under fluorescent excitation illumination.

In contrast to the above mentioned disclosures, the present invention aims at creating variable intensity color halftone images visible under normal daylight which incorporate color halftones produced by combining classical non-luminescent and daylight luminescent inks. The colors of the individual daylight luminescent inks need not be the same as the ones of the classical inks. The synthesized color halftone images may represent continuous tone pictures from different origins such as photographs, graphic designs, paintings or synthetic images.

SUMMARY

The present invention proposes techniques for creating authenticable multi-ink luminescent continuous tone color halftone images with means of verifying their authenticity. In addition, the invented luminescent color halftone image synthesizing techniques enable increasing the attractiveness and aesthetics of color images. When printed on valuable items or on their packages, the authenticable luminescent or partly luminescent color images provide strong means of verifying their authenticity. Counterfeiters do not have access to systems allowing to color separate continuous tone color images into luminescent ink layers and to create faithful color reproductions with daylight luminescent inks. Considered valuable items are banknotes, checks, trust papers, identification cards, passports, travel documents, tickets, diploma, business documents, bank documents, tracing documents, medical drug packages, commercial art, fashion articles, watches, clocks, bottles of perfumes, body care liquids, alcoholic drinks, clothes, as well as attached labels.

The present invention proposes a computer-based method for producing authenticable printed luminescent color images visible under daylight. First, a luminescent set of inks comprising at least one daylight luminescent ink is selected. By relying on a color prediction model, the luminescent gamut of halftones created by the selected luminescent set of inks is established. The gamut of an input image or the gamut of the display device showing the input image is mapped onto the luminescent gamut of the selected luminescent set of inks of by applying gamut expansion and/or gamut reduction operations. Gamut expansion has the effect of increasing the chroma of image parts as well as possibly their lightness. The gamut mapped input image is then separated into the ink layers, i.e. for each gamut mapped input image color, the corresponding surface coverages of the inks are computed, either by using the color prediction model and by fitting the surface coverages of the inks, or by accessing a previously established 3D color separation table creating the relationship between colors and surface coverages of the inks. The resulting color separated image is halftoned and printed. Under a specific excitation illumination, the resulting luminescent halftone image can be authenticated by comparing its excitation trace image, i.e. its image under a specific excitation illuminant, with a corresponding previously registered excitation trace image. If the actual and the previously registered excitation trace images are substantially similar, the luminescent halftone image as well as the support (valuable item) on which it is printed are considered as authentic.

When printed with a luminescent set of inks comprising classical non-luminescent as well as daylight luminescent inks, the resulting daylight luminescent color images have a larger gamut than the ones achievable with classical cyan, magenta, yellow and black inks. This is especially important for high quality faithful color reproductions, such as photographs of paintings.

An additional protection is provided by creating a partly luminescent partly non-luminescent printed output image incorporating a message which remains hidden under a reference illuminant and which is revealed under an illuminant different from the reference illuminant. For that purpose, a set of non-luminescent and a set of luminescent inks are selected. Message areas which contain image colors located at the intersection between luminescent and non-luminescent gamuts can be reproduced with the luminescent set of inks. Optionally, input image colors can be gamut mapped into the volume formed by the intersection between luminescent and non-luminescent gamuts. Within the message areas, the color separation is carried out with the luminescent set of inks and outside the message areas, the color separation is carried out with the non-luminescent set of inks or vice-versa. The resulting partly luminescent halftone image is authenticated by verifying that the message is hidden under the reference illuminant and that it appears under a substantially different illuminant.

A further variant consists in creating two hidden messages, one hidden with the luminescent set of inks under a first reference illuminant and the second one hidden with the luminescent set of inks under a second reference illuminant. The resulting partly luminescent halftone image is authenticated by illuminating it successively with the first and the second illuminant, thereby verifying that each time one of the two messages is hidden and the other one is visible.

An additional variant consists in selecting two different luminescent sets of inks, the first one for hiding a first message and the second one for hiding a second message under selected reference illuminants. In addition to the absence, respectively presence, of the messages under the corresponding respective reference and non-reference illuminants, the resulting partly luminescent halftone image is authenticated by comparing the excitation trace images of the first and second messages with previously registered excitation trace images. Since the two luminescent sets of inks are different, the two colors of the two excitation trace images will also be different. A further variant of printing with two luminescent sets of inks consists in spatially interpolating between the two sets of inks along one orientation, thereby creating an excitation trace image having colors evolving between the excitation trace image of one luminescent set of inks and the excitation trace image of the second luminescent set of inks In case that the input image colors are gamut expanded into the gamut colors of a luminescent set of inks, one may apply gamut expansion only to those regions of the input image which should stand out and attract the attention of the observer. These regions can then be rendered with the luminescent set of inks and authenticated by examining their excitation trace image. In order to avoid discontinuities between gamut expanded regions rendered with the luminescent set of inks and non-gamut expanded or gamut reduced regions, possibly rendered with the non-luminescent set of inks, a deltamap specifies gamut expansion limitation factors at the locations of the gamut expanded regions. These gamut expansion limitation factors are the largest at the boundary of the gamut expanded regions and are reduced as a function of the distance to the boundary. They may be become zero from a certain distance of the boundaries of the gamut expanded parts.

Considered embodiments of printing systems for printing daylight luminescent color images are inkjet, electrophotography, dye diffusion, and thermal transfer printers as well as offset, flexographic, gravure, intaglio and serigraphy printing systems. Further embodiments comprise ink deposition systems as well as patterning systems, such as photolithography, etching, coating, laser marking, laser engraving, and laser ablation.

Authentication of a daylight luminescent color image may be carried out by a human observer as well as by an apparatus incorporating light sources illuminating the images with a reference illuminant and with an excitation illuminant different from the reference illuminant. The apparatus also incorporates a multi-sensor acquisition device (e.g. a camera) acquiring the luminescent color images under the different illuminants. It further incorporates a computing system for memorizing the images under the reference and under the excitation illuminants and for comparing them with corresponding previously registered images and accordingly deciding if the printed luminescent color image is authentic or not. Such an apparatus may work either in reflection mode or in transmissive mode.

A daylight luminescent color halftone image printed on a valuable item can be authenticated by illuminating it with an excitation illuminant such as a UV light and verifying that its excitation trace halftone image exists and that it is substantially similar to a previously registered excitation trace halftone image. In case a message is hidden within the luminescent color halftone image, it will be revealed under the excitation illuminant or under an illuminant substantially different from the reference illuminant. Further sophistication by hiding messages under multiple illuminants or with different luminescent sets of inks is possible.

For a second level authentication, a daylight luminescent color halftone image printed on a valuable item is examined under a magnifying glass or a microscope. An enlarged view of a specific region of the luminescent color halftone image (or a sampled image of that region acquired with a multichannel sensor) is compared with a corresponding registered image of the same region both under normal daylight (first test) and under UV light (second test). If in both cases the acquired enlarged images and the registered images are substantially similar, the luminescent color halftone image and therefore the valuable item are authentic. This check can be performed either by a person or by an authentication apparatus sampling the luminescent color halftone image at a sufficiently high resolution.

BRIEF DESCRIPTION OF THE DRAWINGS

FIGS. 19A, 19C and 19E show an enlargement of respectively the cyan, magenta and yellow separation layers of a non-luminescent $\{c,m,y\}$ halftone and FIGS. 19B, 19D and 19F show an enlargement of respectively the cyan, luminescent magenta and luminescent yellow separation layers of the luminescent $\{c,m_F,y_F\}$ halftone of the same color as the non-luminescent $\{c,m,y\}$ halftone, as created in memory before printing;

FIG. 20A is a grayscale photograph of a color image illuminated by normal daylight, incorporating the messages "LSP" hidden under the D65 illuminant;

FIG. 20B is a grayscale photograph of the same color image, illuminated by UV light, incorporating the messages "LSP" hidden under the D65 illuminant;

FIG. 21A shows the red (R), green (G) and blue (B) channels of a photograph of a "fruits" image printed with a set of inks comprising the classical cyan, magenta, yellow inks as well as the daylight luminescent magenta and daylight luminescent yellow inks, taken under normal daylight; and FIG. 21B shows the red (R), green (G) and blue (B) channels of a photograph of the same reproduced "fruits" image taken under UV light.

DESCRIPTION OF THE INVENTION

Figure 1A:
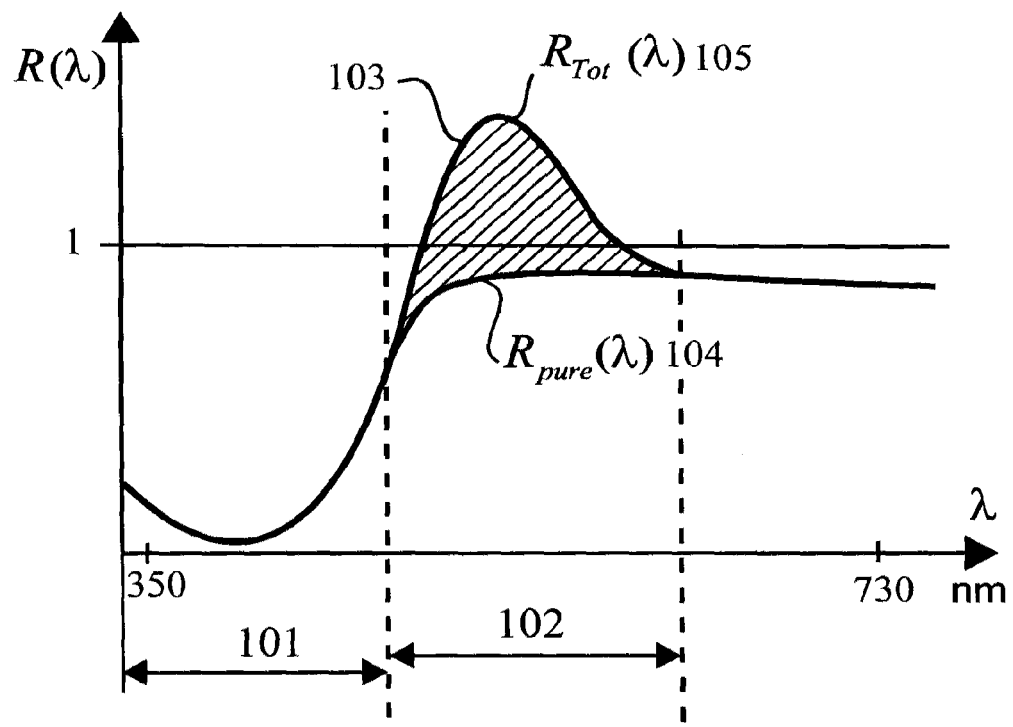
FIG. 1A shows the total reflectance as well as the pure reflectance of a daylight luminescent ink and FIG. 1B shows its emission spectrum.

The present invention aims at producing variable intensity color images visible under normal daylight comprising parts which are produced with classical inks and parts which are produced with daylight luminescent inks, possibly combined with classical inks. The parts produced with classical inks only, called "non-luminescent halftones", form the colors of a normal print gamut. The parts printed with daylight luminescent inks and possibly classical inks, called "luminescent halftones", form the colors of an extended luminescent print gamut and therefore provide visually enhanced printed color images. Such visually enhanced color images tend to capture the observer's attention. A document or a valuable article incorporating on one of its parts a daylight luminescent color image printed with luminescent halftones can be authenticated by observing the luminescent halftones under an illuminant revealing mainly the luminescent emission, e.g. a UV illuminant or a colored illuminant. The comparison between the revealed luminescent image and a known luminescent image enables authentication of the daylight luminescent color image.

Thanks to gamut mapping and color separation with luminescent ink layers, a message can be hidden within the luminescent halftones for a given selected illuminant, for example the D65 illuminant emulating daylight. Under a different illuminant, for example tungsten light (illuminant A) or under a UV illumination, the hidden message is revealed. The revealed message is compared with a known message and depending on the comparison, the daylight luminescent color image can be authenticated.

Regarding the vocabulary, the term "illuminant light source" or simply "illuminant" refers to a light source having a specific spectral power distribution. Given surface coverages of the inks create under a given illuminant a specific color. Under a different illuminant, the same ink surface coverages generally create a different color, especially if the considered inks comprise one or several daylight fluorescent inks. The term "input gamut" refers to the color volume in colorimetric space (e.g. CIELAB) formed by the colors present within an input image, present within several input images or formed by the colors that are displayable on a given display, e.g. an sRGB display. Gamuts are referred to by symbol G and the ink indices, for example the symbol $G_{u,v,w}$ for classical inks u,v, and w or by the symbol $G_{u,vF,wF}$ for classical non-luminescent ink u, daylight luminescent ink $v_F$ and daylight luminescent ink $w_F$. The term "classical inks" refers to inks normally used in printers, such as cyan, magenta, yellow, light magenta, red, green, or blue, which do not exhibit much luminescence, i.e. substantially non-luminescent inks. We therefore also call such inks "non-luminescent inks". The term "luminescent gamut" or "luminescent output gamut" refers to the color volume formed by colors of the output image, printed with halftones made of luminescent and possibly classical inks. The term "non-luminescent gamut" or "classical gamut" refers to the color volume formed by colors of the output image, printed with halftones made of classical inks. The term "luminescent color image" specifies a color image where at least one region of it is rendered and printed with a luminescent set of inks, i.e. a set of inks comprising at least one daylight luminescent ink. A "message" is a piece of information such as a few typographic characters, a word, a sentence, a symbol, a graphic design or a logo. A message can be hidden within a color image. When the message is revealed, it appears as a color or as a multitude of colors that differ from the surrounding image colors. A message is either defined by areas with well delimited contours, e.g. the contours of typographic characters or symbols or it may have unsharp boundaries, i.e. the colors of the message distinguish themselves from the surrounding image colors more at the center of the message elements than at their boundaries. In most examples, we consider a non-luminescent color gamut given by the classical cyan, magenta and yellow inks and luminescent color gamuts given by combinations of classical cyan, magenta luminescent and yellow luminescent inks. However, other non-luminescent inks can also be used, e.g. red, orange, green and blue inks as well as other daylight luminescent inks can be used, for example daylight luminescent cyan, daylight luminescent orange, and daylight luminescent green. Within the present disclosure, input and output images are assumed to be color images. Nevertheless, gray intensities are also part of the color space and as is well known in the art, can be rendered with colored inks. Therefore, the present invention is also applicable to gray level images.

The invention relies on (a) daylight luminescent inks, (b) luminescent color halftones, (c) spectral and/or color prediction models for luminescent halftones, (d) color gamuts produced with combinations of luminescent and non-luminescent inks, (e) color separation into luminescent and/or non-luminescent ink halftone surface coverages, (f) mapping of an input gamut into a luminescent target gamut, (g) mapping of an input gamut into a gamut located at the intersection between a non-luminescent gamut and a luminescent gamut, (h) luminescent color halftone image generation and printing. These elements are detailed in the text that follows.

(a) Daylight Luminescent Inks.

Figure 1B:
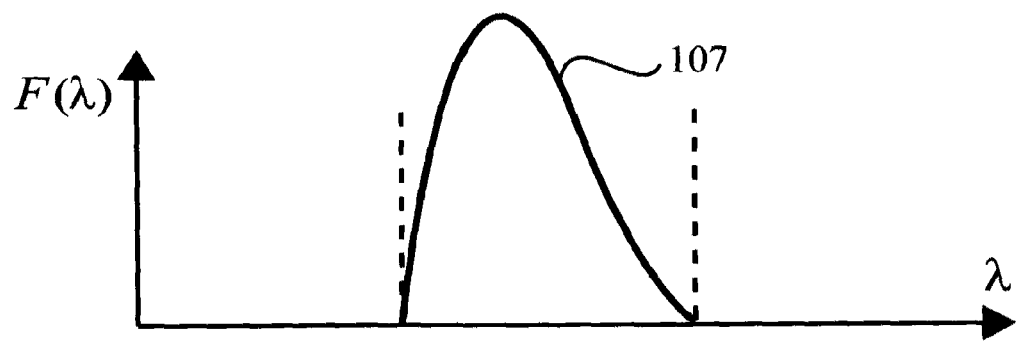

Daylight luminescent inks are inks which have a certain color under daylight, i.e. they absorb light within the excitation wavelength range (FIG. 1, 101), reemit part of the absorbed energy in the emission wavelength range 102 and also reflect the incident light. The total reflectance $R_{tot}(\lambda)$ 105 of a luminescent ink is the sum of the pure reflectance $R_{pure}(\lambda)$ 104 and of the light emission factor $F(\lambda)/I_0(\lambda)$, where $F(\lambda)$ is the irradiance of the luminescent emitted light (FIG. 1B, 107) and $I_0(\lambda)$ is the incident light irradiance. The amplitude of the irradiance $F(\lambda)$ depends on the amplitude and the spectral power distribution of the incident irradiance $I_0(\lambda)$ in the excitation wavelength range. For most luminescent single component inks, varying the spectral distribution $I(\lambda)$ of the incident light only modifies the amplitude of the emission irradiance $F(\lambda)$ and not its spectral distribution.

(b) Luminescent Color Halftones Obtained by Superposed Halftone Ink Layers.

As is known in the art, color halftones may be formed by mutually rotated layers of clustered ink dots (see C. Hains, S. G. Wang, K. Knox, Digital color halftones, in Digital Color Imaging Handbook, G. Sharma Ed, CRC Press, 2003, Chapter 6, Sections 6.1 to 6.4.11, pp. 385-430). They may also be formed by stochastic dots, generated with a blue noise dither matrix, or by error-diffusion (see C. Hains, S. G. Wang, K. Knox, Digital color halftones, in Digital Color Imaging Handbook, G. Sharma Ed, CRC Press, 2003, Chapter 6, Sections 6.8.1 to 6.8.9, pp. 457-470). In these main stream halftoning techniques, halftone ink dot do partially overlap. This means that several inks may be partially superposed and printed at the same pixel locations.

In the case of three classical non-luminescent inks, such as cyan (c), magenta (m) and yellow (y), the superposition of the 3 ink halftone layers yields halftones with colorants comprising the paper white (w), each ink color and each ink superposition color, in the present case: white (w), cyan (c), magenta (m), yellow (y), red (r=m & y), green (g=c & y), blue (b=m & c), and chromatic black (k=c & m & y), where the "&" sign indicates the superposition operation. Therefore, all superposition variants of 3 inks yield 8 colorants and of 4 inks yield 16 colorants.

In the case of combined classical non-luminescent and luminescent inks, the same logic applies. For example, in the case of classical non-luminescent cyan (c), daylight luminescent magenta ($m_F$) and daylight luminescent yellow ($y_F$), the superposition of the 3 ink halftone layers yields halftones with colorants comprising the paper white (w), each ink color and each ink superposition color, in the present case: white (w), cyan (c), luminescent magenta ($m_F$), luminescent yellow ($y_F$), luminescent red ($r_F=m_F$ & $y_F$), i.e. the superposition of luminescent magenta and luminescent yellow inks, luminescent green ($g_F$=c & $y_F$), i.e. the superposition of cyan and luminescent yellow inks, luminescent blue ($b_F$=c & $m_F$), i.e. the superposition of cyan and luminescent inks, and luminescent brown ($k_F$=c & $m_F$ & $y_F$), i.e. the superposition of the cyan, luminescent magenta and luminescent yellow inks When printing the ink layers independently of one another, for example with mutually rotated layers, with blue noise dithering, or with error diffusion, the surface coverages of the colorants $a_1$ to $a_8$ representing the paper, the single inks or the superpositions of two or three inks can be expressed as functions of the surface coverages of the inks $u_1, u_2, u_3$, as follows:

$$a_1=(1-u_1)(1-u_2)(1-u_3); \quad a_2=u_1(1-u_2)(1-u_3); \quad a_3=(1-u_1)u_2(1-u_3);$$

$$a_4=(1-u_1)(1-u_2)u_3; \quad a_5=u_1u_2(1-u_3); \quad a_6=u_1(1-u_2)u_3;$$

$$a_7=(1-u_1)u_2u_3; \quad a_8=u_1u_2u_3; \qquad (1)$$

Equations (1) are known as the Demichel equations and are also valid in case that one or several inks are luminescent inks. They can be extended to 4 or more inks, see Th. Bugnon, M. Brichon, R. D. Hersch, Simplified Ink Spreading Equations for CMYK Halftone Prints, Proc. SPIE Color Imaging XIII: Processing, Hardcopy, and Applications, Vol. 6807, paper 680717, pp 1-12, herein incorporated by reference.

In the case of luminescent halftones created with several different luminescent inks, the halftone emission irradiance spectrum $F_h(\lambda)$ depends on the spectral distribution of the illuminant $I(\lambda)$. As an illustration, consider two luminescent inks A and B with respective emission spectra $F_{A1}(\lambda)$ and $F_{B1}(\lambda)$ under illuminant $I_1(\lambda)$ and emission spectra $F_{A2}(\lambda)$=a $F_{A1}(\lambda)$ and $F_{B2}(\lambda)$=b $F_{B1}(\lambda)$ under illuminant $I_2(\lambda)$ placed side by side, forming a halftone with each ink having a 50% surface coverage. Then, the resulting halftone emission spectrum under illuminant $I_1(\lambda)$ is $F_{h1}(\lambda)$=½ $F_{A1}(\lambda)$+½ $F_{B1}(\lambda)$ and under illuminant $I_2(\lambda)$ is $F_{h2}(\lambda)$=½$F_{A2}(\lambda)$+½ $F_{B2}(\lambda)$=½ a $F_{A1}(\lambda)$+½ b $F_{B1}(\lambda)$. Since in the general case the two scalar values a and b are different one from another, halftone emission spectrum $F_{h2}(\lambda)$ under illuminant $I_2(\lambda)$ is not a scaled instance of halftone emission spectrum $F_{h1}(\lambda)$ under illuminant $I_1(\lambda)$. Such a halftone has therefore different emission colors under different illuminants. Note that under UV light (black light), the emission colors are directly visible.

(c) Spectral and Color Prediction Models for Classical and Luminescent Halftones.

The goal of a color prediction model is to establish a mapping between ink surface coverages of a selected set of inks and resulting colors. When such a mapping is known, one find the inverse mapping, i.e. the mapping between desired color and ink surface coverages of the considered set of inks. Under a given illuminant, the light reflected by a known reflectance spectrum can always be converted to a color (see Eq. (4) in the next section). Therefore, every spectral prediction model is also a color prediction model.

As alternative to a color prediction model, one may directly establish a mapping between desired color and surface coverages of the inks by printing samples with combinations of all selected inks at variations of surface coverages e.g. surface coverages of [0, 0.05, 0.10, . . . 0.95, 1]. This yields 21 samples per ink, i.e., for a luminescent set of 3 inks, 9261 samples. Each sample is measured by a spectrophotometer under the reference illumination and converted to a color value. One may then interpolate between these color values to create the mapping between desired color and surface coverages of the inks, see R. Bala, Chapter 5, Device Characterization, Section 5.4.5. Lattice-based interpolation, in Digital Color Imaging Handbook, (Ed. G. Sharma), pp. 301-304.

The Yule-Nielsen modified Spectral Neugebauer prediction model (hereinafter: YNSN) specifies the non-linear relationship between the reflectance $R(\lambda)$ of a color halftone, the reflectances of the halftones individual solid colorants $R_i(\lambda)$ and their surface coverages $a_i$ by a power function whose exponent n can be optimized according to the reflectance of a limited set of color halftone patches, see Wyble, D. R., Berns, R. S., A Critical Review of Spectral Models Applied to Binary 4Color Printing. Journal of Color Research and Application Vol. 25, No. 1, 2000, pp. 4-19, incorporated by reference.

$$R(\lambda) = \left(\sum_i a_i * R_i(\lambda)^{\frac{1}{n}}\right)^n \quad (2)$$

Instead of the YNSN model described by Eq. (2), it is also possible to use a color prediction model, where reflectances are replaced by colorimetric values, such as CIE-XYZ tri-stimulus values or multiple broadband sensor responses, such as red, green, blue and possibly infra-red sensor responses. It is also possible to use a different spectral prediction model, such as the Clapper-Yule model, see R. D. Hersch, P. Emmel, F. Collaud, F. Crete, Spectral reflection and dot surface prediction models for color halftone prints, Journal of Electronic Imaging, Vol. 14, No. 3, 2005, article 33001, pp. 1-12.

In order to make accurate spectral or color predictions, the YNSN model needs to be extended, for example by combining it with an ink spreading model, see the following publication about the ink-spreading enhanced YNSN model, incorporated by reference: R. D. Hersch, F. Crété, Improving the Yule-Nielsen modified spectral Neugebauer model by dot surface coverages depending on the ink superposition conditions, Color Imaging X: Processing, Hardcopy and Applications, Proc SPIE 5667, 2005, pp. 434-445, hereinafter referenced as [Hersch 2005].

The prediction accuracy is further improved for halftones combining classical and luminescent inks by allowing within the ink-spreading enhanced YNSN model each ink halftone to have its optimal n-exponent and by computing the overall n-exponent for each considered halftone as a weighted average of the inks n-exponents, with the weights being given by a parabolic function of the surface coverages of the inks. For a system of 3 inks with nominal surface coverages $u_1, u_2, u_3$ and corresponding best n-exponents $n_1, n_2$ and $n_3$ fitted at 50% nominal surface coverages, we calculate the optimal n-exponent $$n_{opt} = \frac{n_1 \cdot p(u_1) + n_2 \cdot p(u_2) + n_3 \cdot p(u_3)}{p(u_1) + p(u_2) + p(u_3)} \quad (3)$$

where p(u) is the parabola equation $p(u)=-4 \cdot (u-\frac{1}{2})^2+1$. This optimal n-exponent is then used as n-exponent in Eq. (2), for surface coverages a, derived from Eq. (1). The corresponding theory has been published on the 14 of Jun. 2010 in the article by Romain Rossier and Roger D. Hersch, "Ink-dependent n-factors for the Yule-Nielsen modified spectral Neugebauer model," Proc. 5th European Conference on Colour in Graphics, Imaging, and Vision (CGIV 2010), Joensuu, Finland, pp. 202-206, herein incorporated by reference, referred to as [Rossier and Hersch, 2010].

Another possibility of extending the YNSN model in order to provide higher prediction accuracy is to consider not only reflectances $R_i$ of printed patches at all combination of 0 and 1 surface coverages (8 combinations for 3 inks), but reflectances of printed patches $R_i$ (called sub-domain reflectances) at all combinations of 0, 0.5 and 1 surface coverages (27 combinations for 3 inks). According to this extension, derived from the known cellular Neugebauer model (see R. Balasubramanian, Optimization of the spectral Neugebauer model for printer characterization, J. Electronic Imaging, Vol. 8, No. 2, 156-166, 1999, incorporated by reference), reflectance predictions are carried out within the sub-domains formed by ink surface coverages either between 0 and 0.5 or between 0.5 and 1. Ink spreading is accounted for within each sub-domain. The details are given in the article by R. Rossier and R. D. Hersch, "Introducing ink spreading within the cellular Yule-Nielsen modified Neugebauer model", to be published on the 7 of Nov. 2010 at the 18$^{th}$ Color Imaging Conference, herein incorporated by reference.

(d) Luminescent Color Gamuts Produced with Combinations of Luminescent and Non-Luminescent Inks.

We describe new methods for the computer-based rendering and printing of images with daylight luminescent inks. Since a set of available daylight luminescent inks may not allow to produce the colors printable with classical cyan, magenta, yellow and black inks (hereinafter: "cmyk inks"), it is necessary to consider printing images with a combination of daylight luminescent ink and classical (non-luminescent) inks. As example, we consider a system for printing with daylight luminescent yellow (hereinafter: $y_F$), daylight luminescent magenta (hereinafter: $m_F$), classical cyan (hereinafter: c), classical magenta (hereinafter: m), classical yellow (hereinafter: y) and classical black (hereinafter: k) inks. In order to create a printed color image with a color gamut as large as possible and with the strongly saturated colors offered by daylight luminescent inks, we consider the gamut (volume in a 3D colorimetric space such as CIELAB) of all possible colors which may be generated with the above set of luminescent and classical non-luminescent inks. A first sub-gamut is formed by the colors printable with the set of inks $m_F$ (daylight luminescent magenta), $y_F$ (daylight luminescent yellow) and c (cyan) under a selected reference illuminant. By considering suitable variations of surface coverages of the set of $\{c, m_F, y_F\}$ inks, for examples in steps of 0.02, we obtain according to the ink spreading extended YNSN model described by Eqs. (1), (2) and (3) the corresponding set of total reflectances $\vec{R_1}, \vec{R_2}, \ldots$ . For the selected reference illuminant, this set of total reflectances can be converted to tri-chromatic CIE-XYZ values and then to CIELAB values [Sharma 2003]. The conversion of a spectrum $\vec{R_i}$ to tri-stimulus CIE-XYZ is carried out with the selected reference illuminant $\vec{I_{ref}}$ according to the well-known formula $$\begin{bmatrix} X \\ Y \\ Z \end{bmatrix} = K \cdot \begin{bmatrix} \vec{x} \\ \vec{y} \\ \vec{y} \end{bmatrix} \cdot \text{diag}(\vec{R_i}) \cdot \vec{I_{ref}} \quad (4)$$

where the "diag" operator creates a matrix whose diagonal elements comprise the spectral reflectance components of $\vec{R_i}$ and whose other elements are zero and where the vectors $\vec{x}$, $\vec{y}$ and $\vec{z}$ contain the color matching coefficients of the color matching functions known as $\bar{x}(\lambda), \bar{y}(\lambda)$, and $\bar{z}(\lambda)$. Vectors $\vec{I_{ref}}$ and $\vec{R_i}$ have one sample per wavelength, for example 36 samples at wavelengths [380 nm, 390 nm, . . . 730 nm]. As known in the art, K is a normalization scalar calculated to yield a Y value of 100 for the unity reflectance $[1\ 1\ \ldots\ 1]^T$. The reference illuminant $\vec{I_{ref}}$ is also used to calculate the CIE $X_n, Y_n, Z_n$, value of the white stimulus used for computing the CIELAB values.

Figure 2A:
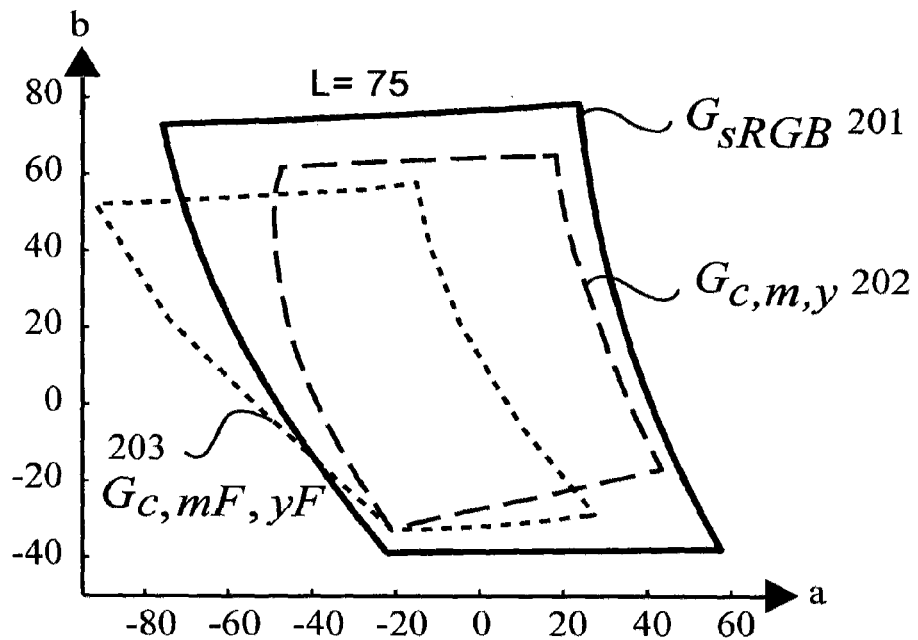
FIGS. 2A and 2B show at different lightness levels a display gamut $G_{sRGB}$, a classical cyan magenta and yellow gamut $G_{c,m,y}$ as well as a luminescent gamut $G_{c,mF,yF}$ formed by cyan, daylight luminescent magenta and daylight luminescent yellow inks.
Figure 2B:
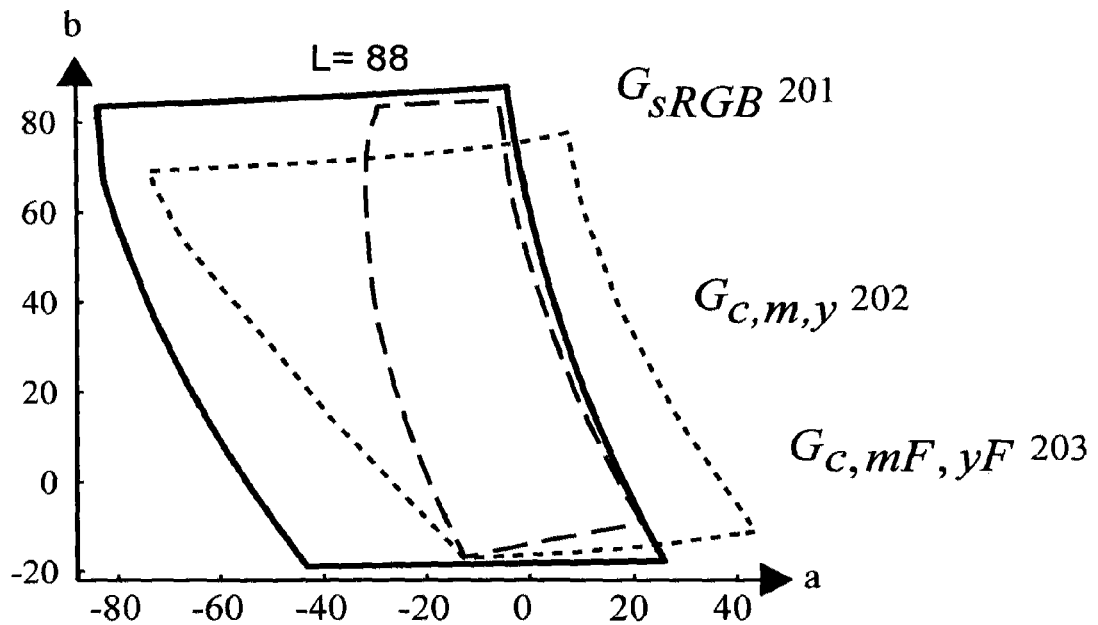

These CIELAB values span the sub-gamut (sub-volume in CIELAB) denominated $G_{c,m_F,y_F}$. In a similar manner, the set of inks $\{c, m_F, y\}$ allows producing colors with the luminescent sub-gamut $G_{c,m_F,y}$. The set of inks $\{c, m, y_F\}$ allows producing colors with the luminescent sub-gamut $G_{m,yF,c}$. Similarly, the classical set of inks {c, m, y} allow producing colors with the luminescent sub-gamut $G_{c,m,y}$. The set of inks {c, m, y, k} allows producing colors within the classical ink gamut $G_{c,m,y,k}$. Corresponding colors are predicted with an ink-spreading enhanced YNSN model extended to the 4 cmyk inks. As illustration, FIGS. 2A and 2B show schematically a typical input gamut $G_{sRGB}$ (sRGB display gamut 201) as well as the $G_{c,mF,yF}$ (203), and $G_{c,m,y}$ (202) sub-gamuts, displayed at two CIELAB L lightness ranges of L=75 and L=88. The total target gamut $G_{c,m,y,k,mF,yF}$, of the set of inks {c, m, y, k, $m_F$, $y_F$} may be union of the $G_{c,mF,yF}$, $G_{c,mF,y}$, $G_{c,m,yF}$, $G_{c,m,y}$ and $G_{c,m,y,k}$ sub-gamuts. Its external hull is formed by the hull of the union of these gamuts. Alternately, one may use a spectral prediction model extended to 6 inks (e.g. {c, m, y, k, mF, yF}) in order to directly obtain the largest possible $G_{c,m,y,k,mF,yF}$ gamut achievable with these inks.

In case that a message needs to be hidden within the luminescent halftones, a possible target output gamut is the gamut formed by the intersection of the classical ink gamut $G_{c,m,y}$ or $G_{c,m,y,k}$ and of the luminescent ink gamut $G_{c,mF,yF}$. Alternately one may use the $G_{c,m,y}$ or $G_{c,m,y,k}$ classical gamut as target output gamut and create the areas of the message whenever possible with the luminescent set of inks, and when impossible, with the classical non-luminescent set of inks. This will create a luminescent message only within message areas of the output color halftone image, whose colors are located within the luminescent gamut $G_{c,mF,yF}$.

(e) Color Separation into Luminescent and/or Non-Luminescent Ink Halftone Surface Coverages.

For the color separation of digital color images into daylight luminescent ink print layers, we create a color separation table incorporating the correspondence between colorimetric values (e.g. CIELAB) and surface coverages of the inks. Since, in the present example, we consider printing halftones with the subsets of inks {c,$m_F$, $y_F$}, {c,m, $y_F$}, {c,$m_F$, y}, {c, m, y}, for each CIELAB entry in the 3D color separation table, we enter the corresponding nominal surface coverages for each of the 4 considered ink subsets. When one subset of inks is not able to produce a given color, the corresponding entry contains a corresponding flag (e.g. the number −1). The nominal surface coverages are fitted by minimizing the sum of the differences between desired CIELAB L*a*b* color components and predicted L*a*b* color components under a reference illuminant according to a selected prediction model, e.g. the ink spreading enhanced YNSN model, augmented with ink-dependent n-factors [Rossier and Hersch 2010]. This is performed by a computer executable optimization procedure such as the "fminsearch" or "fmincon" function offered by the Matlab package. After having created the color separation table, at image creation time, the input image colors can be color separated into surface coverages of the inks by interpolating between the stored table values.

(f) Mapping of an Input Gamut into a Luminescent Target Gamut

The goal is to map an input gamut given for example as sRGB values or as input cyan $c_{in}$, magenta $m_{in}$, and yellow $y_{in}$ values into an output gamut printable with a daylight luminescent set of inks. There are several ways of generating daylight luminescent color prints from original color images by mapping the input color gamut onto the luminescent target gamut, for example $G_{c,m,y,mF,yF}$.

Figure 3A:
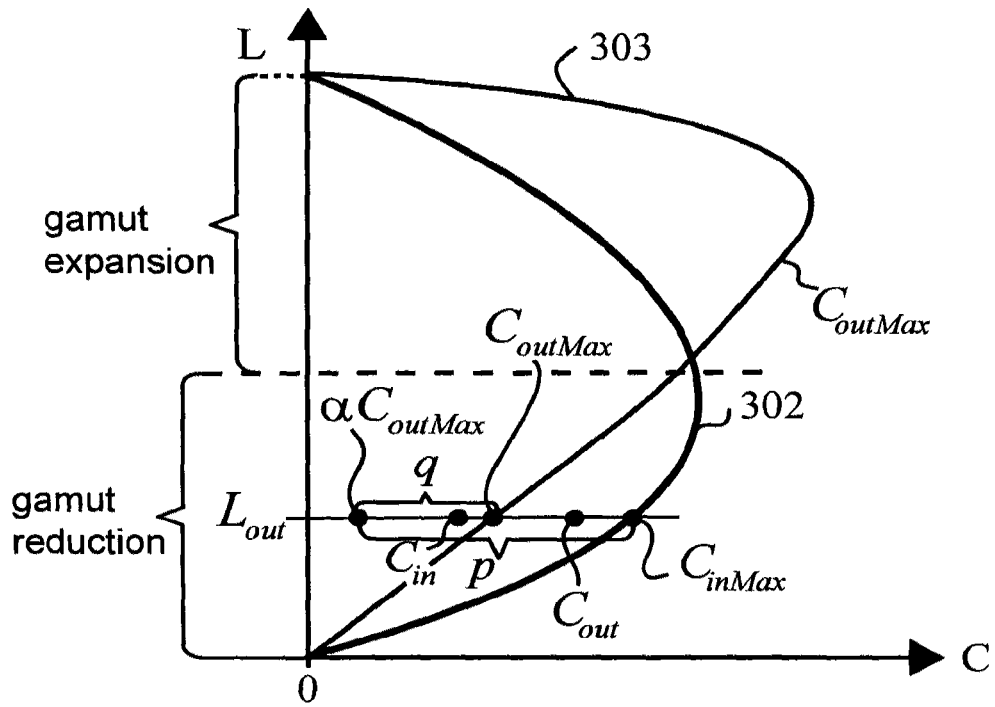
FIGS. 3A and 3B show an input gamut 302 and a luminescent output gamut 303, as well as corresponding gamut expansion-reduction schemes.
Figure 3B:
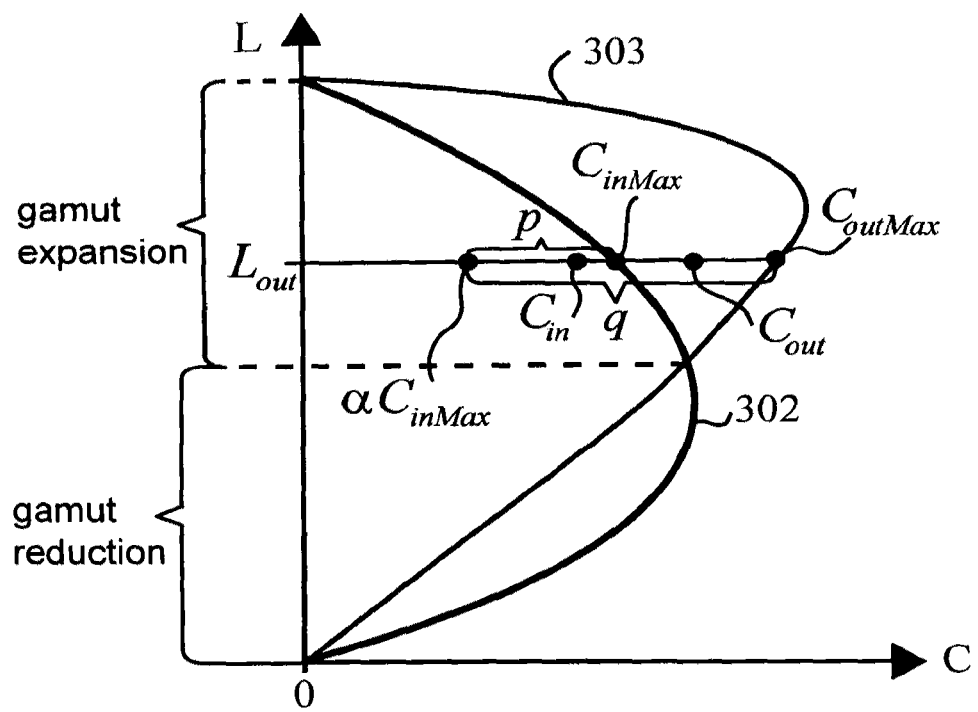

FIG. 3 shows a typical example where the input gamut 302 is partially inside and partially outside the luminescent output (target) gamut 303. Therefore, in order to have a mapping between the input gamut and the luminescent output gamut which expands the input gamut towards the luminescent gamut and at the same time preserves the hues as much as possible, there is a need to perform both gamut reduction and gamut expansion. A method for gamut reduction has been described in U.S. patent application Ser. No. 11/785,931 to Hersch, Donzé, and Chosson [Hersch, Donzé, Chosson 2007]. A method for gamut expansion is described in the publication by T. Morioka, Y. Azumi and M. Inui, "A psychophysical evaluation of a gamut expansion algorithm based on chroma mapping", published in Proc. International Conference on Digital Printing Technologies, Baltimore, USA, 2005, pp. 433-436. Another method of gamut expansion is proposed in U.S. Pat. No. 5,317,426, "Color estimation method for expanding a color image for reproduction in a different color gamut", to T. Hoshino, priority Nov. 26, 1990. The hue preserving gamut reduction and/or expansion method proposed in the present disclosure relies on the mapping $\Lambda$ of the input lightness range into the luminescent output gamut lightness range, e.g. a linear mapping, on the preservation of the hue and on the mapping of the input chroma range into the output chroma range of the luminescent gamut (FIGS. 3A and 3B).

Before performing the mapping of an input gamut into an output luminescent gamut, one must be able to compute the external hulls of both the input and the output gamuts with a method known in the art, for example by computing in 3D a mesh of the gamut's hull, see T. Cholewo, S. Love, Gamut boundary determination using alpha-shapes, Proc. IS&T $7^{th}$ Imaging Conf., pp. 200-204, 1999, incorporated by reference, hereinafter referenced as [Cholewo and Love 1999] or by computing in 2D, separately for each hue or for each lightness slice (e.g. a hue slice may correspond to a hue angle interval $\Delta h$ of 15 degrees and a lightness slice to a lightness interval $\Delta L$ of 5) the boundaries of input and output gamuts.

Gamut expansion and gamut reduction are performed as follows. First, a given input CIELAB lightness $L_{in}$ is mapped into the corresponding output lightness $L_{out}$ by the lightness mapping operation $\Lambda$. Then, for the current hue angle $h_{in}$=arc $\tan(b_{in}/a_{in})$, the input chroma $C_{in}$ is mapped into an output chroma $C_{out}$. Mapping the input CIELAB chroma $C_{in}$= $((a_{in})^2+(b_{in})^2)^{1/2}$ to the output chroma $C_{out}$ requires intersecting the constant $L_{out}$ chroma line passing through $C_{in}$ with the input and output gamut boundaries and obtaining the respective intersection points $C_{inMax}$ and $C_{outMax}$. The chroma remains constant ($C_{out}=C_{in}$) in the C interval between 0 and $\alpha C_{inMax}$ in case $C_{inMax}<C_{outMax}$ (gamut expansion, FIG. 3B upper part) and between 0 and $\alpha C_{outMax}$ in case $C_{inMax}>C_{outMax}$ (gamut reduction, FIG. 3A lower part). The factor $\alpha$, between 0 and 1, for example ½, defines the internal part of the gamut where the chroma does not change. In case of gamut expansion (FIG. 3B, upper part), the part of the input chroma $\alpha C_{inMax}<C_{in}<C_{inMax}$ is mapped according to the following formula $$C_{out} = \alpha \cdot C_{inMax} + \left(\frac{C_{in} - \alpha \cdot C_{inMax}}{C_{inMax} - \alpha \cdot C_{inMax}}\right)^{\gamma} (C_{outMax} - \alpha \cdot C_{inMax}) \quad (5)$$

where the $\gamma$ exponent expresses a possible non-linearity of the chroma mapping. With $\gamma=1$, the mapping is linear.

In case that the maximal gamut expansion is not desired, one may use a gamut expansion limitation factor $\delta$. This gamut expansion limitation factor limits the effective maximal gamut expansion $C_{outMaxEff}$ to values between $C_{outMax}$ and $C_{inMax}$, see FIG. 4B. The effective maximal gamut expansion becomes $$C_{outMaxEff} = C_{inMax} \delta + C_{outMax}(1-\delta) \quad (6)$$

This effective maximal gamut expansion chroma $C_{outMaxEff}$ then replaces $C_{outMax}$ in Eq. (5).

In case of gamut reduction (FIG. 3A, lower part), the part of the input chroma $\alpha C_{outMax} < C_{in} < C_{inMax}$ is mapped according to the following formula $$C_{out} = \alpha \cdot C_{outMax} + \left(\frac{C_{in} - \alpha \cdot C_{outMax}}{C_{inMax} - \alpha \cdot C_{outMax}}\right)^\gamma (C_{outMax} - \alpha \cdot C_{outMax}) \quad (7)$$

FIGS. 3A and 3B show the geometries of both gamut expansion and gamut reduction. In FIG. 3A, the gamut reduction consists in keeping the chroma C between 0 and $\alpha C_{outMax}$ without change and in mapping the input chroma interval p from $\alpha C_{outMax}$ to $C_{inMax}$ into the interval q from $\alpha C_{outMax}$ to $C_{outMax}$. In FIG. 3B, the gamut expansion consists in keeping the chroma between 0 and $\alpha C_{inMax}$ without change and mapping the input chroma interval p from $\alpha C_{inMax}$ to $C_{inMax}$ into the interval q from $\alpha C_{inMax}$ to $C_{outMax}$. Therefore, in both the expansion and reduction cases, in the low saturation region formed by colors with chroma $C_{in} <= \alpha C_{outMax}$, respectively $C_{in} <= \alpha C_{inMax}$, the output chroma values are kept equal to the input chroma values. Note that in these two cases, there is no further modification of the lightness, beyond the one performed during the lightness mapping operation $\Lambda$, i.e. $L_{out} = \Lambda(L_{in})$. Note that for the wide gamut reproduction of color images, it may be sufficient to apply gamut reduction (see section: "Application V: Creation of luminescent wide gamut color images").

Figure 4A:
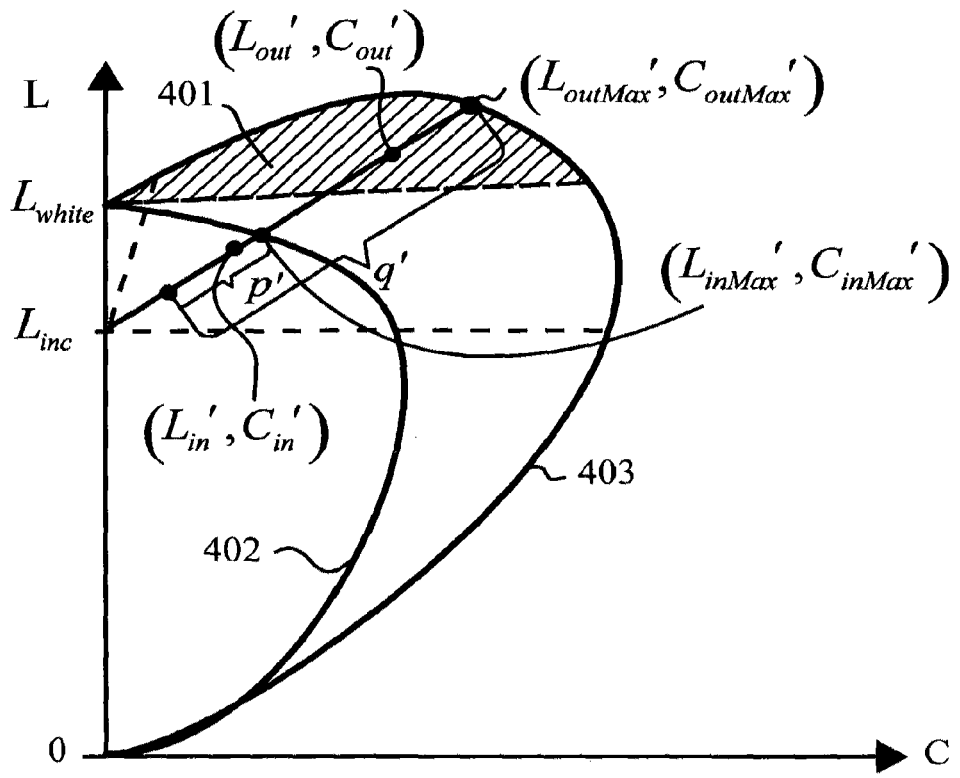
FIG. 4A shows an input gamut 402 and a luminescent output gamut 403 whose maximal lightness is higher than the achromatic white.
Figure 4B:
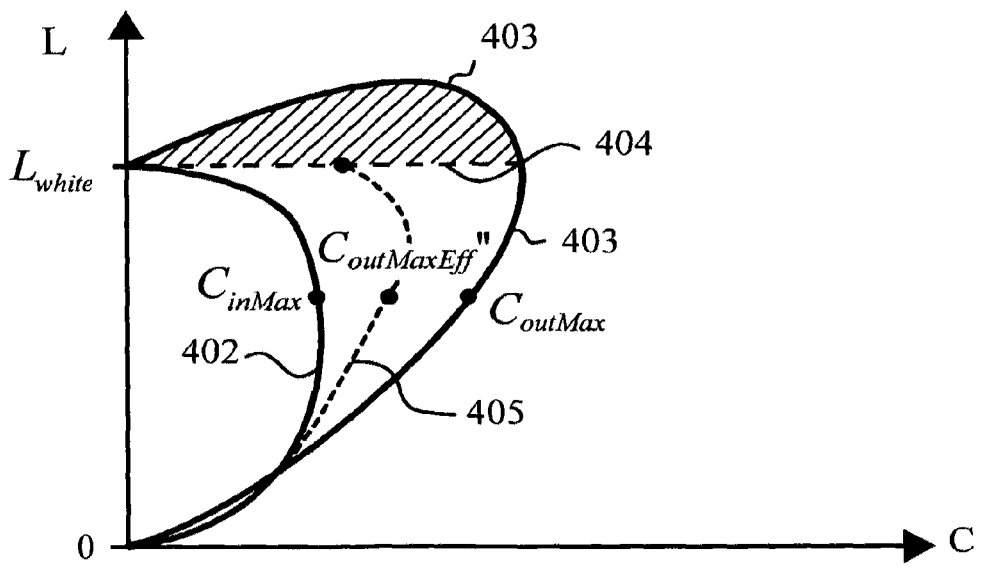
FIG. 4B shows similar gamuts as FIG. 4A, where the maximal chroma values $C_{outMax}$ of the luminescent gamut are reduced to effective maximal chroma values $C_{outMaxEff}$.

There are cases where due to a strong luminescence of one or several inks, part of the luminescent output gamut has a CIELAB lightness larger than the lightness $L_{white}$ of the white reference. FIG. 4A shows the input display gamut and the output luminescent print gamut along a constant hue slice. A non-zero chroma region 401 comprises colors of a lightness higher than $L_{white}$, i.e. colors with a lightness higher than the lightness of the white substrate on which the inks are printed or higher than the lightness of the unity reflectance. In order to map the input to the output gamut by performing a gamut expansion making use of the increased lightness regions, we define a lightness $L_{inc}$ from which input color chroma in intervals p' are centrally projected into corresponding output color chroma in intervals q' of the output gamut, keeping their hues constant and increasing their respective chroma and lightnesses. This may be carried out by calculating the intersection of the line defined by the achromatic color $(L,C) = (L_{inc}, 0)$ and by the color $(L_{in}' = \Lambda(L_{in}), C_{in}')$ with the input gamut boundaries (402) and the output gamut (luminescent gamut 403) boundaries, yielding the respective intersections $(L_{inMax}', C_{inMax}')$ at chroma $C_{inMax}'$ and $(L_{outMax}', C_{outMax}')$ at chroma $C_{outMax}'$. In case $C_{in} > \alpha C_{inMax}'$, the mapping from lightness mapped input color $(L_{in}', C_{in}', h')$ to output color $(C_{out}', C_{out}', h')$ may be calculated according to Equation (8):

$$\begin{bmatrix} L_{out}' \\ C_{out}' \end{bmatrix} = \begin{bmatrix} L_{inc} \\ 0 \end{bmatrix} + \alpha \begin{bmatrix} L_{inMax}' - L_{inc} \\ C_{inMax}' \end{bmatrix} + \left(\frac{C_{in}' - \alpha \cdot C_{inMax}'}{C_{inMax}' - \alpha \cdot C_{inMax}'}\right)^\gamma \left(\begin{bmatrix} L_{outMax}' \\ C_{outMax}' \end{bmatrix} - \alpha \begin{bmatrix} L_{inMax}' - L_{inc} \\ C_{inMax}' \end{bmatrix}\right) \quad (8)$$

If $<C_{in}' = \alpha C_{inMax}'$, the identity mapping is applied, i.e. $(L_{out}' = L_{in}')$ and $(C_{out}' = C_{in}')$. For lightnesses $L_{in}' <= L_{inc}$, normal gamut expansion given by Equation (5) or respectively gamut reduction given by Equation (7) apply.

Expression (8) indicates that colors with lightness $L_{in}'$ larger than $L_{inc}$ and chroma $C_{in}'$ larger than $\alpha C_{inMax}'$, i.e. colors which are neither dark nor desaturated are mapped towards the more saturated and higher lightness colors offered by the luminescent gamut 401.

Here also, one may limit the gamut expansion with a gamut expansion limitation factor $\delta$, and obtain effective maximal lighness and chroma as follows:

$$C_{outMaxEff}' = C_{inMax}' \delta + C_{outMax}'(1-\delta) \quad (9)$$

$$L_{outMaxEff}' = (L_{inMax}' - L_{inc})\delta + (L_{outMax}' - L_{inc})(1-\delta) + L_{inc} \quad (10)$$

These $C_{outMaxEff}'$ and $L_{outMaxEff}'$ values replace $C_{outMax}'$ and $L_{outMax}'$ in Eq. (8).

The gamut expansion with increased lightness is appropriate for color images where colors such as yellow, orange, red or green are to be highlighted, for example in the case of graphic designs or publicity. However, such an increased lightness gamut expansion is not always desirable, for example when human skin needs to be reproduced. In that case, one may artificially clip the boundary of the output gamut to lightness values equal or lower than $L_{white}$, see FIG. 4B, 404. This is done by simply performing the constant lightness gamut expansion-reduction according to Equations (5) and (7).

The mapping of an input gamut into the luminescent target gamut can be embodied by a gamut mapping table in the selected colorimetric space, e.g. CIELAB. In such an embodiment, each CIELAB entry representing an input color such as a display color incorporates a mapped luminescent target CIELAB value. In another embodiment, gamut mapping can be incorporated into the color separation table by having directly for each CIELAB entry (input color) the surface coverages yielding when printed with the corresponding subset of luminescent and/or classical inks, the mapped CIELAB values.

(g) Mapping of an Input Gamut into a Gamut Located at the Intersection Between a Non-Luminescent Gamut and a Luminescent Gamut In applications, where a message is hidden into a color image, one may use as output gamut the gamut that can be rendered with both the luminescent and the non-luminescent inks. It is located at the intersection between the non-luminescent ink gamut and the luminescent ink gamut. The input gamut is mapped into the output gamut by combining gamut expansion and reduction or by gamut reduction alone. The goal is to bring input gamut colors into colors located within the boundaries of the intersection between the non-luminescent and the luminescent color gamuts. The gamut mapping methods described in the previous section (f) are applicable. However, instead of considering as output gamut the intersection between the non-luminescent ink gamut and the luminescent ink gamut, one may also use the larger $G_{c,m,y}$ or $G_{c,m,y,k}$ classical gamut as target output gamut and halftone the areas of the message whenever possible with the luminescent set of inks, and when impossible, with the classical non-luminescent set of inks.

(h) Color Image Halftone Generation and Printing with Daylight Luminescent Inks

Figure 5:
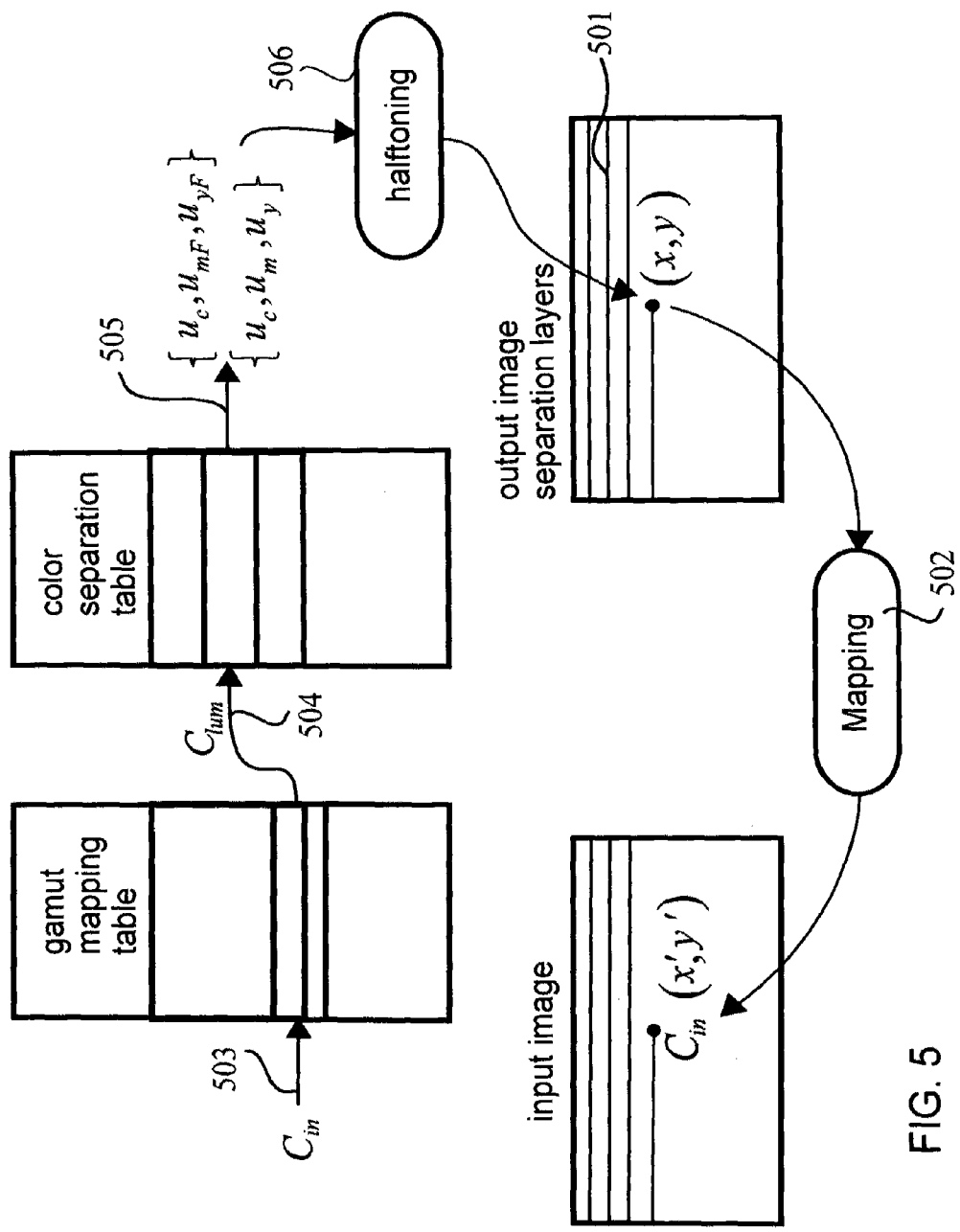
FIG. 5 shows schematically the processes contributing to the creation of halftoned daylight luminescent color images.

Color image halftone generation is carried out by creating in a computer memory the separation layers corresponding to the input image. The separation layers indicate if an ink or no ink is to printed or how much of each ink is to printed at each output pixel location. Output image separation layers are created by scanning in computer memory the output image representation, scanline by scanline (FIG. 5, 501) and pixel by pixel, at each output pixel (x,y) finding according to the mapping (502) between input image and output image space, the corresponding location (x', y') within the input image, reading the color $C_{in}$(x',y') at that location, performing the gamut mapping by accessing (503) the gamut mapping table and reading the mapped color $C_{lum}$(x',y'), performing the color separation by accessing (504) the color separation table and reading (505) the surface coverages of the selected subset of inks, e.g. $\{u_c, u_{mF}, u_{yF}\}$ or $\{u_c, u_m, u_y\}$, and with the obtained surface coverages, performing the halftoning (506) according to the selected halftoning method, for example, classical screening by dithering the ink layers with mutually rotated clustered dot dither matrices or FM screening with a blue-noise dispersed dither matrix. In case that both a luminescent and a non-luminescent set of inks is used, each set including 3 or 4 inks, the classical mutually rotated clustered dot techniques can be applied. Since an output image pixel is either printed with an ink from the non-luminescent or from the luminescent set of inks, ink layers of the two sets can share the same rotated halftone layers. For example, with the two sets of inks $\{c, m, y\}$, and $\{c, m_F, y_F\}$, cyan (c) is screened at an orientation of 15°, magenta (m) shares with luminescent magenta ($m_F$) the 75° orientation and yellow (y) shares with luminescent yellow ($y_F$) the 45° orientation. For sets of inks with more than 4 inks, up to 6 orientated line screens can be used (orientations 15°, 45°, 75°, 105°, 135°, 165°. One can also use color FM screening or color error diffusion (see C. Hains, S. G. Wang, K. Knox, Digital color halftones, in Digital Color Imaging Handbook, G. Sharma Ed, CRC Press, 2003, Chapter 6, pp. 385-470).

The halftoning operation 506 indicates, for each ink layer, if the current pixel is to be set or not, or in case of variable pixel dot sizes, the dot sizes at which the inks are to be printed. Once created, the separation layers are sent to the printer for printing (printing technologies: ink-jet, electrophotography, thermal transfer, etc. . . . ) or are used to create the plates for offset printing, the cylinders for gravure printing or the screen for screen printing. The resulting printed image will incorporate the target output color image, printed with the selected subsets of inks.

Application I: Embedding a Message Hidden by Luminescent Halftones Within a Printed Image.

Figure 6:
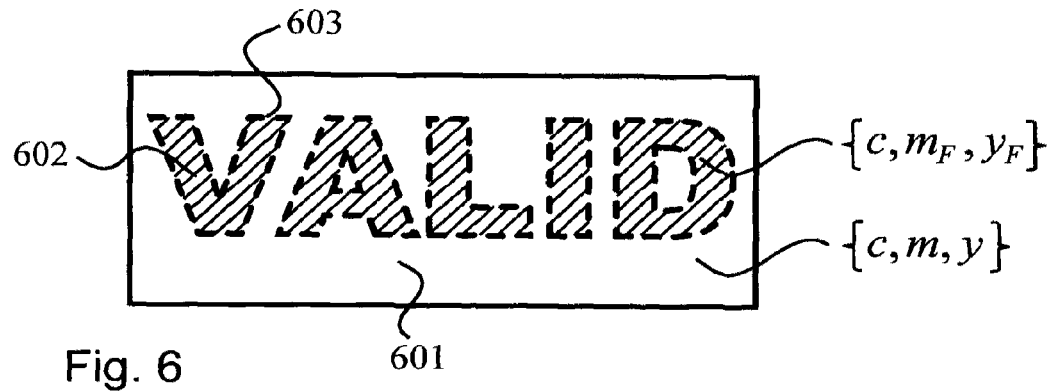
FIG. 6 shows an example of a color image printed with cyan, magenta, and yellow inks incorporating a hidden message printed with cyan, daylight luminescent magenta and daylight luminescent yellow inks.
Figure 7A:
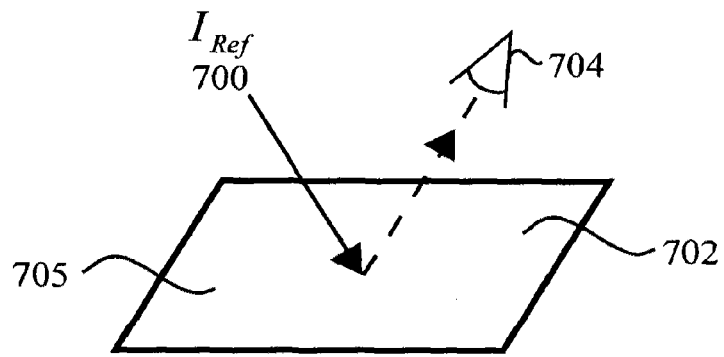
FIG. 7A shows that the message of FIG. 6 is hidden when viewed under the reference illuminant $I_{Ref}$ and FIG. 7B shows that it appears under an illuminant $I_{UV}$ or $I_B$ different from the reference illuminant.

Since the subsets of inks, in the present example the subsets $\{c,m_F, y_F\}$, $\{c, m_F, y\}$, $\{c,m, y_F\}$, and $\{c, m, y\}$ have partially overlapping gamuts, colors located at the intersection of the luminescent $\{c,m_F, y_F\}$ and the classical non-luminescent $\{c, m, y\}$ gamuts can be generated under a selected reference illuminant either with luminescence or without luminescence. After mapping of image input colors to colors located at the intersection between luminescent and non-luminescent gamuts or to colors located within the non-luminescent gamut, it is possible to incorporate onto the variable intensity color or grayscale image (FIG. 6, 601) to be reproduced a hidden message 602, e.g. the letters "VALID". The halftone colors inside the areas 603 formed by the letters are whenever possible reproduced with a luminescent subset of inks, e.g. $\{c,m_F, y_F\}$ and the halftone colors outside the letter areas are reproduced with a non-luminescent subset of inks, e.g. $\{c, m, y\}$. Since the spectral prediction model, respectively the color prediction model, enables creating within the color separation table for each entry accurate values of the amounts of inks (surface coverages), under a selected reference illuminant (e.g. D65 simulating a daylight illuminant), it is not possible to distinguish under that reference illuminant the color printed with the luminescent ink subset and the one printed with the non-luminescent ink subset. Therefore, the message areas (dashed line 603) remain hidden under that reference illumination; only the variable intensity color image is visible (FIG. 7A, 702). Under a different illuminant, e.g. a UV illuminant, a blue light illuminant, or a tungsten lamp illuminant (illuminant A), the luminescent inks create a luminescent emission different from the one allowing to hide the message. For example, when the color halftone generated with inks $\{c,m_F, y_F\}$ is not distinguishable from the one generated with inks $\{c, m, y\}$ under a D65 illuminant, the two halftones will be clearly distinguishable under an A illuminant. Luminescent emission of ink halftones induced by an illuminant different from the reference illuminant (FIG. 7B, 703) makes the hidden message areas stand out of the surrounding image (702), and reveals its message. Therefore, a message printed with luminescent halftones hidden under a reference illuminant and appearing under an illuminant different from the reference illuminant indicates that the valuable item (document, article) on which the image is printed is authentic. When viewed under a UV illuminant (e.g. UV-A black light), the hidden message is revealed as a colored image, named "UV illuminant excitation trace image", or "UV excitation trace image". Under a colored illuminant in the excitation wavelength range of the luminescent halftone, the corresponding colored illuminant excitation trace image is revealed. For example, under a blue excitation illuminant, a yellow luminescent ink contributing to a visible halftone may produce a blue illuminant excitation trace image with a green or with a greenish yellow that is different from the one seen under daylight. As a concrete example, FIG. 20A shows a photograph (converted to grayscale) of a printed luminescent color image taken under normal daylight, hiding the message "LSP" under the D65 illuminant. FIG. 20B is a photograph (converted to grayscale) of the same printed luminescent color image, taken under UV light. The corresponding original color photograph represents the UV excitation trace image of that printed luminescent color image.

Figure 8A:
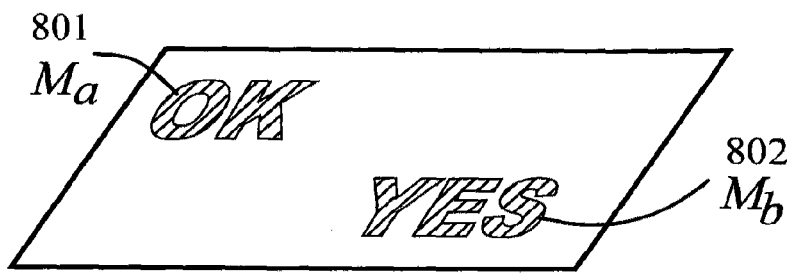
FIGS. 8A, 8B, 8C, and 8D show a first message $M_a$ hidden under illuminant $I_a$ and a second message $M_b$ hidden under illuminant $I_b$, which are individually revealed respectively under illuminant $I_b$ and $I_a$ or are both revealed under illuminant $I_c$.
Figure 8B:
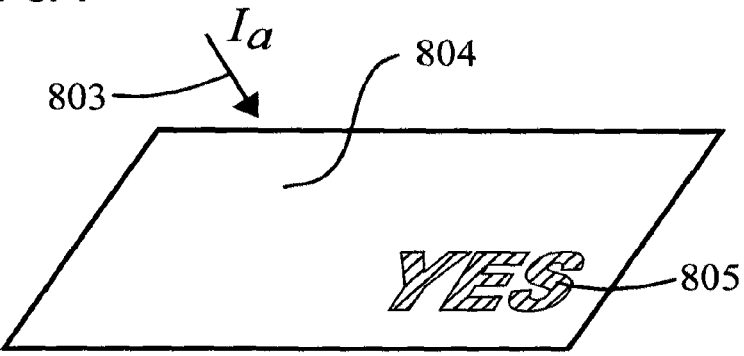
Figure 8C:
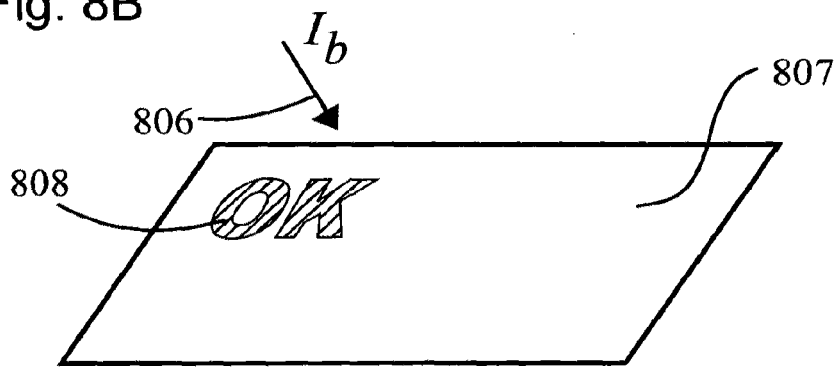
Figure 8D:
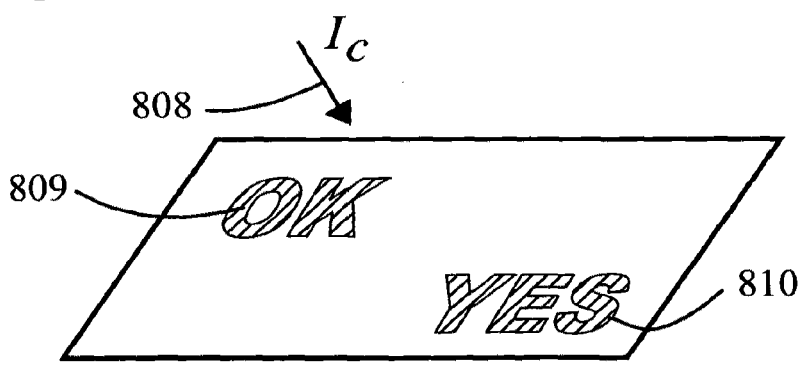

Application II: Embedding Within a Printed Image Multiple Messages Hidden by Luminescent Halftones, Each One Under a Different Reference Illuminant In the present application, instead of hiding a message within an image only when seen under a single illuminant, one may hide message $M_a$ (FIG. 8A, 801) under a first reference illuminant $I_a$ and hide a second message $M_b$ (802) under a second reference illuminant $I_b$. Therefore, when seen under illuminant $I_a$ (FIG. 8B, 803), message $M_a$ (804) is hidden and message $M_b$ (805) is revealed and when seen under illuminant $I_b$ (FIG. 8C, 806), message $M_b$ (807) is hidden and message $M_a$ (808) is revealed. Under a third non-reference illuminant $I_c$ (FIG. 8D, 808), both messages $M_a$ (809) and $M_b$ (810) are revealed. Under a specific UV illuminant (black light) or under a specific visible colored illuminant, each message is revealed by its corresponding trace image (UV excitation trace image or colored illuminant excitation trace image).

Application III: Embedding Multiple Hidden Messages Comprising Different Halftones Exhibiting Different Luminescent Properties Within the Printed Luminescent Image.

Figure 9A:
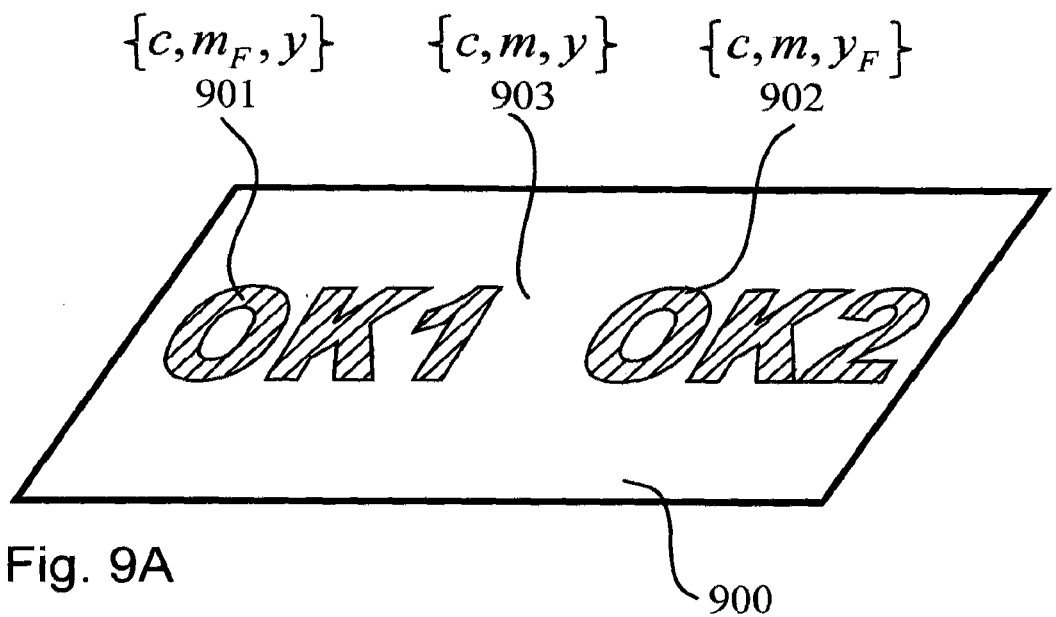
FIGS. 9A and 9B show a first message hidden with a first set of luminescent inks and a second message hidden with a second set of luminescent inks, which are both revealed under an illuminant different from the reference illuminant, e.g. a UV light source.
Figure 9B:
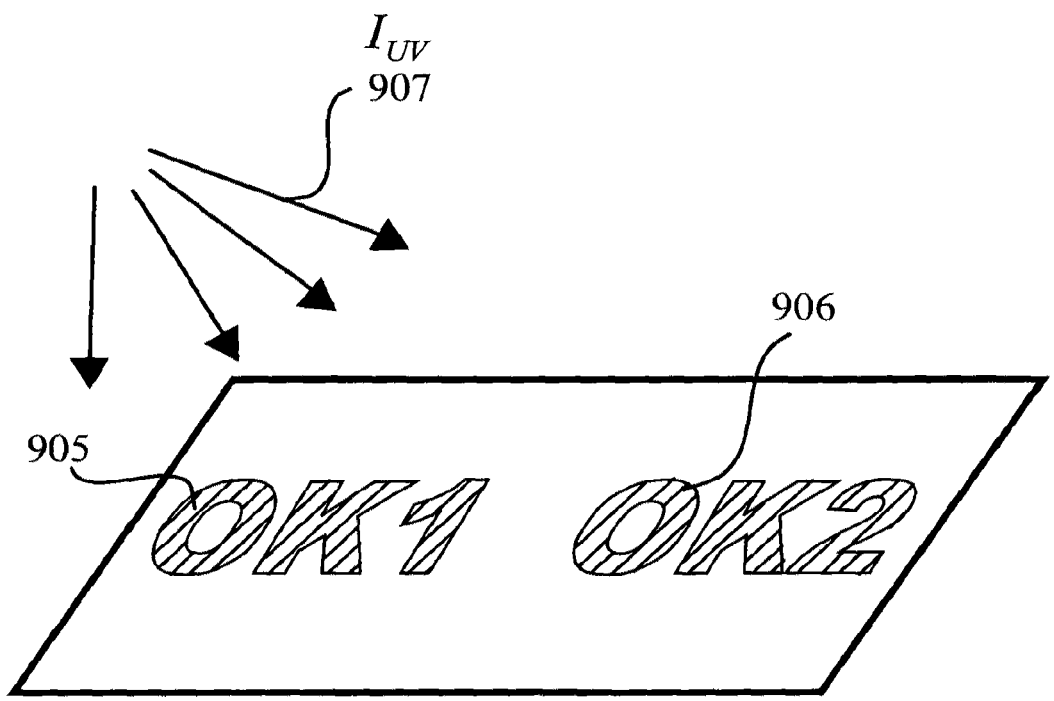

There can be many different luminescent subsets of inks, in the present example the subset with the luminescent magenta $\{c,m_F, y\}$ and the subset with the luminescent yellow ink $\{c,m, y_F\}$. It is possible to associate within a color image (FIG. 9A, 900) different subset of luminescent inks to different messages, located each one within its specific areas, for example allocating the subset $\{c,m_F, y\}$ to the areas "OK1" (FIG. 9A, 901) and the subset $\{c,m, y_F\}$ to the areas "OK2" (902). Colors at the intersection of the gamuts of the different luminescent subsets and of the non-luminescent subset can be halftoned and printed either as non-luminescent halftone colors or as halftone colors with specific luminescence properties associated to the corresponding luminescent subset of inks. In the present case, the luminescent subset $\{c, m_F, y\}$ has the property of emitting in the red wavelength range under UV light and the subset $\{c, m, y_F\}$ has the property of emitting in the green wavelength range under UV light. When a hidden message is halftoned with a specific subset of inks, the content of that message and the emission color specific to that subset of inks are revealed under UV light. In FIG. 9B, message "OK1" appears in red (905) and message OK2 appears in green (906) as UV excitation trace images under UV light (907). Checking both the presence of the message and of the emission colors of the UV excitation trace images offers an additional means for authenticating the image incorporating the hidden message.

Application IV: Embedding Hidden Messages Comprising Halftones by Spatially Interpolating Between Two or More Subsets of Inks.

Figure 10:
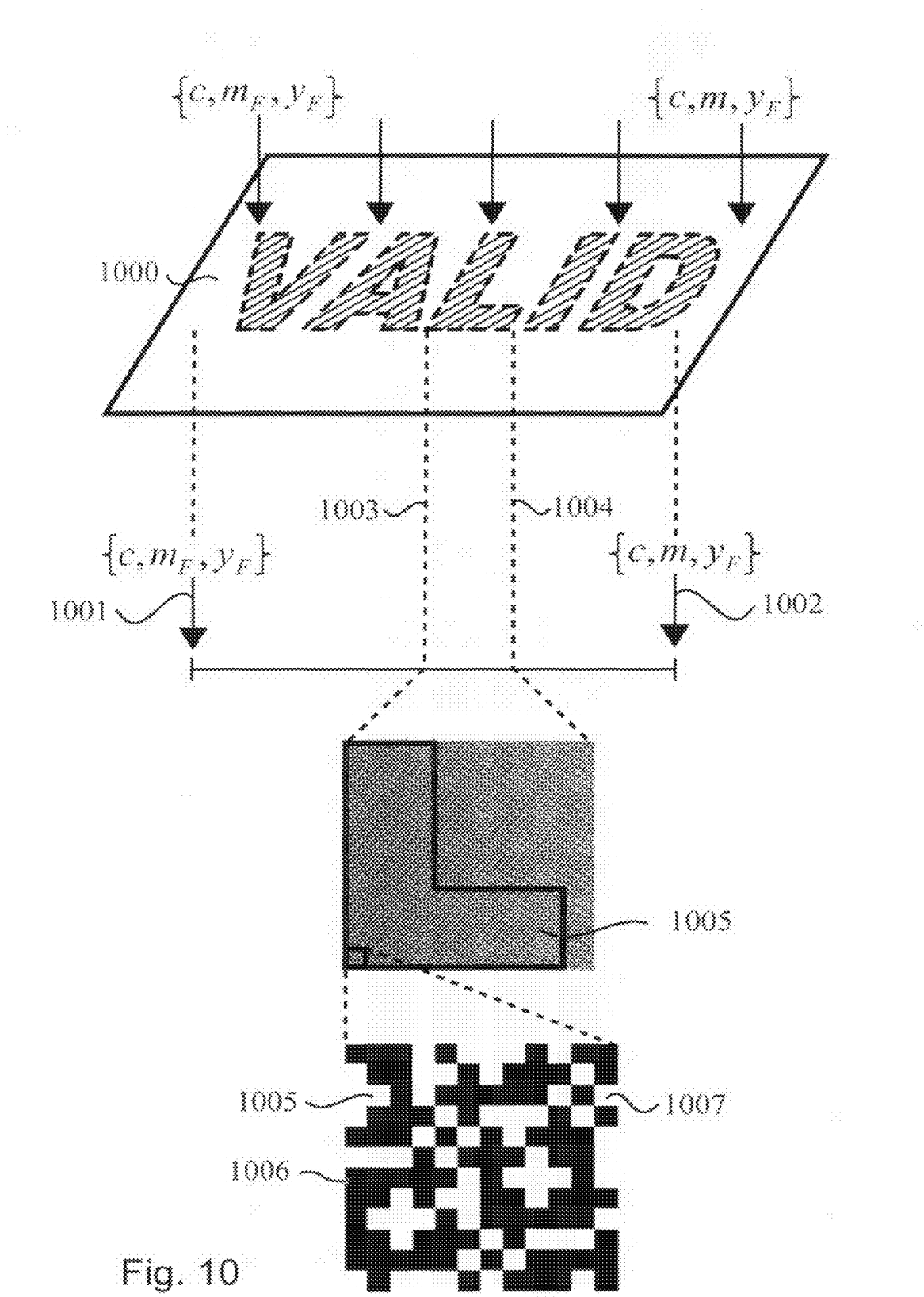
FIG. 10 shows a message hidden by interpolating between two sets of luminescent inks, where the interpolation is performed spatially.

One may hide a message within a color image (FIG. 10, 1000) whose colors within the message areas are located at the intersection of the non-luminescent (e.g. $\{c,m,y\}$) and the luminescent (e.g. $\{c, m_F, y\}$, $\{c, m, y_F\}$) color gamuts. The message components (e.g. its individual letters) can be halftoned with halftones comprising a weighted average of two (or more) luminescent subsets of inks. The respective weights of the luminescent ink subsets are calculated according to the position of the message components. The weighted average is performed spatially, for example by allocating part of the output pixels to halftones of the first subset of inks and part of the output pixels to halftones of the second subset of inks. Classical dithering techniques allow for example to define these two sets of pixels, according to the ratio of the weights of the luminescent ink subsets. When the color image with the hidden message is revealed under UV light (black light), the message appears as a UV excitation trace halftone image (or under a specific colored illuminant as a colored illuminant excitation trace halftone image) with colors varying smoothly between the emission color of the first luminescent ink set and the emission color of the second luminescent ink set. In the example of FIG. 10, at each horizontal position, there is another ratio of the weights of the $\{c, m_F, y\}$ (1001) and $\{c, m, y_F\}$ (1002) subsets of inks. At the border of letter "L", we have the ratios given by positions 1003 and 1004, e.g. 2/5 and 3/5. The dithering pattern 1005, is obtained by dithering a horizontally linear range of intensities between 2/5 and 3/5, e.g. with a rotated Bayer dither matrix (see U.S. Pat. No. 5,438, 431) or with a small diagonally oriented cluster-dot screen. The black and white pixel regions 1006 and 1007 obtained by the dithering operation indicate respectively locations where the message is halftoned with the $\{c, m_F, y_F\}$ ink set and locations halftoned with the $\{c, m, y_F\}$ ink set.

Application V: Creation of Luminescent Wide Gamut Color Images

In addition to the creation of authenticable color prints, the present invention also enables the wide gamut reproduction of input color images. This is especially important for high quality faithful color reproductions, such as reproductions of art paintings for postcards, books and posters. As can be seen in the examples of FIGS. 2A and 2B the display gamut ($G_{sRGB}$) is considerably larger than a typical classical cyan, magenta and yellow ($G_{c,m,y}$) ink gamut or in general, than a classical cyan, magenta and yellow and black ink gamut ($G_{c,m,y,k}$). But the union of the gamut (e.g. $G_{c,m,y}$) formed by classical inks and the gamut (e.g. $G_{c,mF,yF}$) formed by a luminescent set of classical and daylight luminescent ink is closer to the display gamut and therefore enables a more faithful reproduction of input image colors. The gamut mapping maps the input gamut (e.g. $G_{sRGB}$) into the union of the luminescent and classical non-luminescent gamuts (e.g. $G_{c,m,y} \vee G_{c,mF,yF}$) or into the smooth gamut (e.g. $G_{c,m,y,mF,yF}$) obtainable with a set of more than 3 inks (e.g. the set of 5 inks $\{c, m, y, m_F, y_F\}$). The colors produced by a set of more than 3 inks can be predicted with a spectral or color prediction model accounting for the number of used inks (e.g. the ink-spreading enhanced YNSN model, extended to 5 inks).

When carrying out the color separation of an input color image, colors reproducible only with the classical set of inks are reproduced by performing the color separation with the classical non-luminescent inks and colors reproducible only with the luminescent set of inks are reproduced by performing the color separation with the luminescent set of inks. In regions reproducible by both sets of inks, one may perform the color separation by either of the two sets of inks or by spatially interpolating (see Application IV, spatial interpolating by dithering) between the classical and luminescent color separations. The red (R), green (G) and blue (B) channels of a color photograph of a color image printed with cyan, magenta, yellow, daylight luminescent magenta and daylight luminescent yellow inks, taken under normal daylight, are shown in FIG. 21A. The red, green and blue channels of a color photograph of the same printed color image taken under UV light are shown in FIG. 21B. This color photograph forms the UV excitation trace image of that printed luminescent color image and can be used for its authentication.

Application VI: Creation of Luminescent Enhanced Color Images

By having the possibility of mapping an input gamut to an output luminescent ink gamut (see Section (0)), one may create luminescent enhanced color images which under daylight have outstanding picture elements and which, under a UV illuminant, respectively under a colored illuminant, allow these outstanding picture elements to appear as UV excitation trace images, respectively as colored illuminant excitation trace images. These trace images can be identified and compared with pre-recorded trace images. This enables combining into a single printed design both protective and decorative features. For example, the design of a package for a beauty article needs to be attractive and at the same time offers a simple means of verifying that the corresponding article is authentic.

Since the color gamuts obtainable with all considered ink sets and ink subsets are known, a soft proofing software module running on a computing system can display a preview of (a) the color image printed with classical inks only e.g. $\{c, m, y\}$ and (b) a preview of the same image, but gamut expanded into the luminescent gamut, printed with a combination of classical and luminescent inks, e.g. $\{c, m, y, m_F, y_F\}$. These two views give the designer an idea of how specific parts of the image can be gamut extended so as to reinforce their appearance. Based on these views, the designer can specify by a selection operation, for example with a lasso tool, the elements that should stand out within the target color image. These elements are created by combining classical and luminescent inks and by applying gamut expansion.

Since the emission spectra of the daylight fluorescent inks and of their superpositions under UV light are known, the software previewing module can also predict the emission spectra of color halftones viewed under UV light, for example by applying the ink spreading enhanced Yule-Nielsen Spectral Neugebauer model [Hersch 2005]. The predicted emission spectra are converted into a CIE-XYZ color (for more details, see [Hersch, Donzé, Chosson 2007]) and are therefore displayable on a display (e.g. by a CIE-XYZ to sRGB conversion, as known in the art). The predicted emission color image can be saved onto a computer server and recalled later in order to compare it with the corresponding color image viewed under UV light (black light). Depending on the comparison, one may decide if the color image is authentic or not.

Figure 11A:
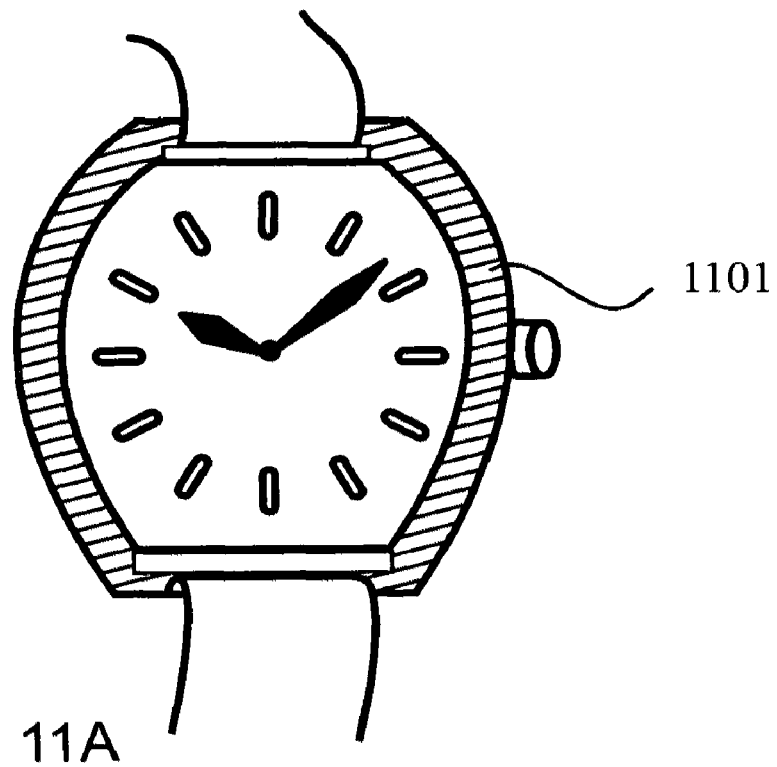
FIG. 11A shows the picture of a watch, whose golden frame is rendered with a set of daylight luminescent inks, which is revealed in FIG. 11B under an illuminant different from the reference illuminant.
Figure 11B:
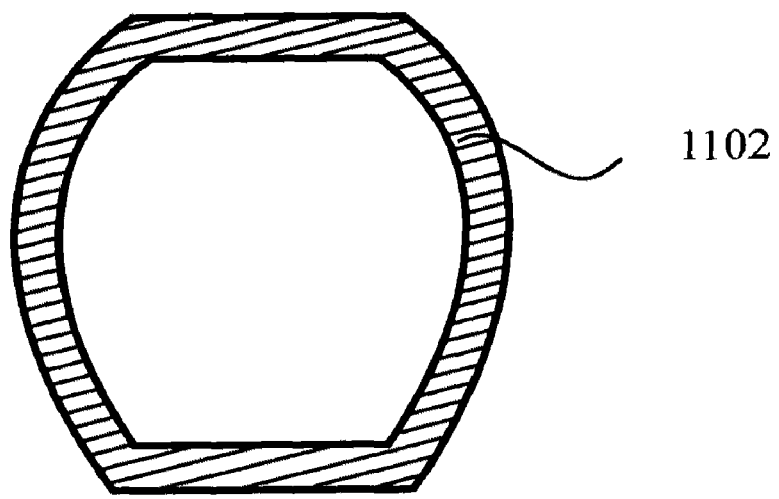

As an example, FIG. 11A shows an authentic graphic design representing a watch with a golden frame 1101. In order to underline that the watch frame is made of gold, the elements formed by this golden frame are selected, their colors are gamut expanded and printed with luminescent inks. By examining that printed document under a UV illuminant, the golden watch frame appears as a green frame (1102) within the UV illuminant trace image. The authenticity of the document can be verified by typing the ID number of this watch on the corresponding Web authentication server. If authentic, the same green watch frame picture is displayed as the one seen under the UV illuminant.

Figure 12:
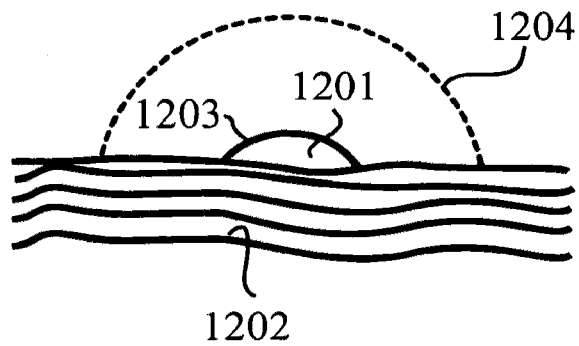
FIG. 12 shows a setting sun over the ocean, where the red sky surrounding the sun is rendered with a low gamut expansion limitation factor and where the gamut expansion limitation factor increases as a function of the distance from sky locations to the sun boundary.

In the case of color images obtained by photography, the designer may decide to limit the gamut expansion by creating a deltamap with δ values, in order to allow only a certain degree of gamut expansion. For example, in a picture of a setting sun over the ocean (FIG. 12, 1202), different parts (1203 to 1204) of the reddish sky are imaged with different gamut expansion limitation factors. The sun (1201) has a gamut expansion limitation factor δ=0, i.e. the full luminescent gamut is used. At the boundary of the sun 1203, δ=0, and at a certain distance 1204 of the sun, δ=1, i.e. we have a total gamut expansion limitation. In between, there may be a linear or a non-linear interpolation between the sun boundary 1203 and distance 1204, for example a function f(x) of the relative distance of a point in respect to the boundary of the sun 1203. The color of the UV excitation trace image depends on the deltamap defining the degree of gamut expansion limitation.

Figure 13:
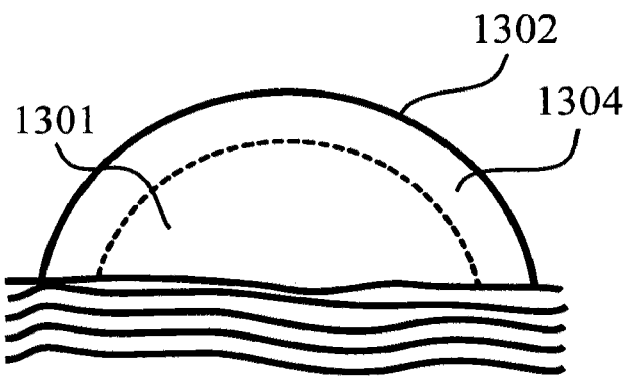
FIG. 13 shows a setting sun over the ocean, where the sun boundary is rendered with a high gamut expansion limitation factor and where the gamut expansion limitation factor decreases as a function of the distance from sun locations to the sun boundary.

In another setting, pixels close to the boundaries of the selected element areas (e.g. the boundary 1302 of the sun 1301 in FIG. 13) may have a strong expansion limitation factor, (e.g. a δ factor close to 1) and pixels further away from the boundaries have a low or zero δ expansion limitation factor. One may for example define a boundary offset region 1304 within the selected element area, where the δ expansion limitation factor is inversely proportional to the distance to the element boundary 1302. The soft proofing software module can then display the resulting partly luminescent color image. The designer can further modify its element selections and gamut expansion limitation parameters until he is satisfied with the result. He may then ask the computing system to perform the color separation of the resulting image into the ink layers, halftone them and send the resulting ink halftone layers to the printer. Here also, if needed, the excitation trace image seen under a UV illuminant or under a colored illuminant can be compared against the one registered onto a Web server.

Computer-Based Implementation of the Methods for Creating Daylight Luminescent Color Halftone Images.

Figure 14:
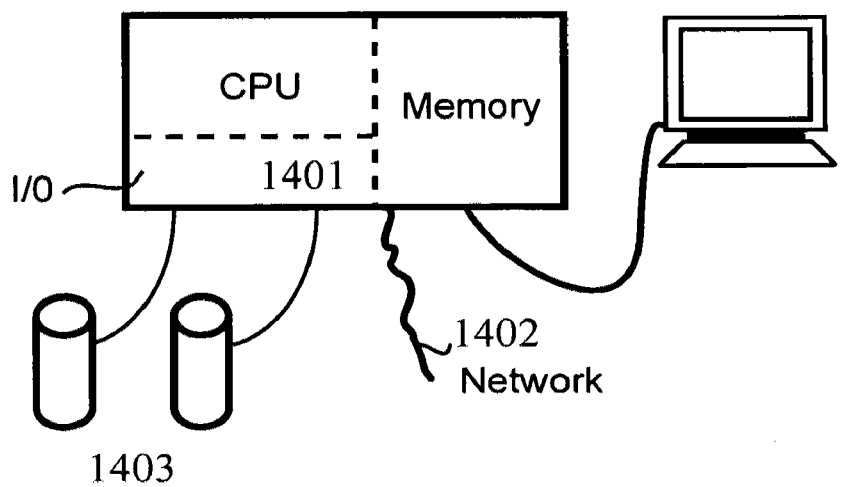
FIG. 14 shows a computing system for creating luminescent color halftone images comprising a CPU, memory, I/O interfaces, disks, a display, a keyboard and a network connection.
Figure 15:
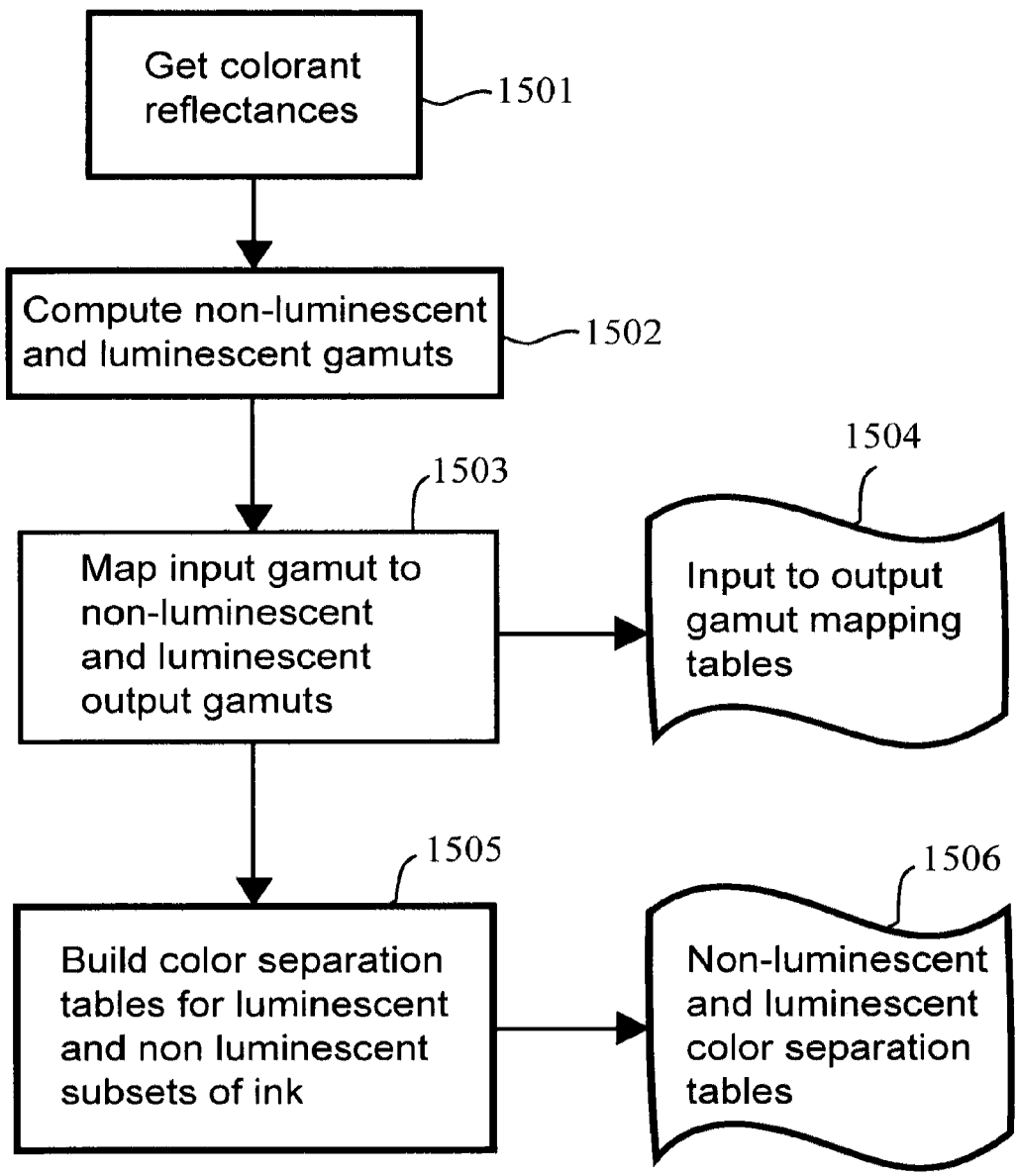
FIG. 15 describes the initialization steps performed when launching the computing system creating daylight luminescent color halftone images.
Figure 16:
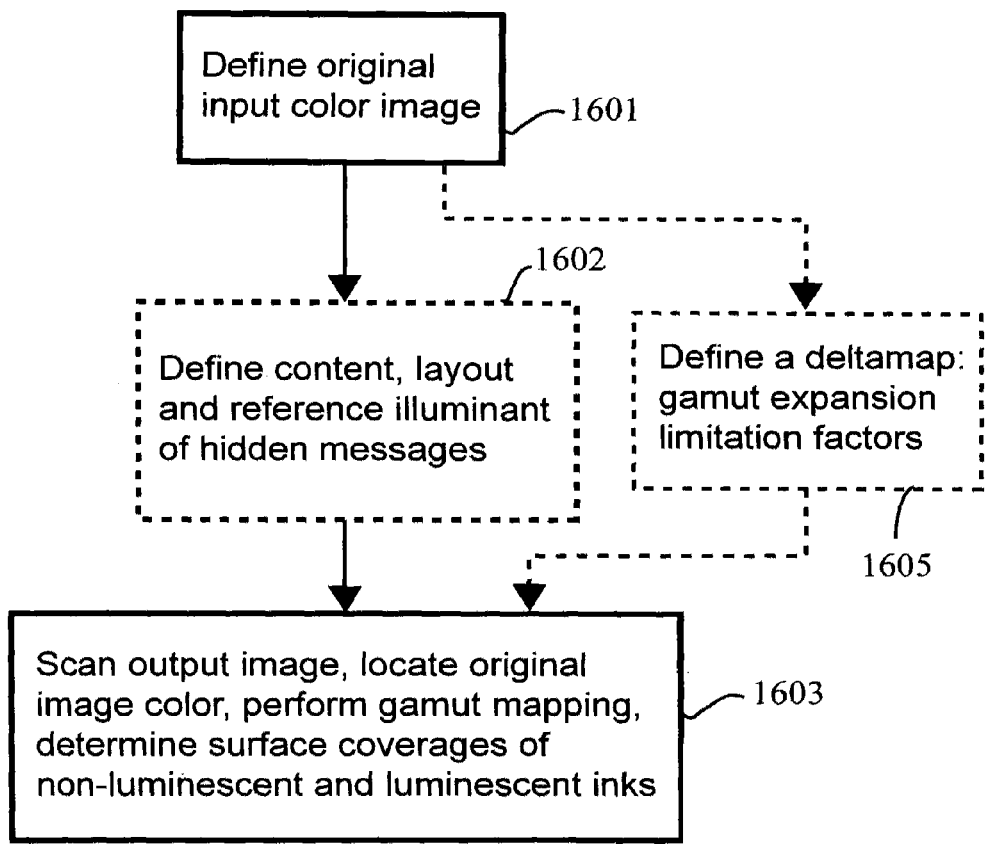
FIG. 16 shows steps performed in order to create daylight luminescent color images possibly incorporating hidden messages.

A software package running on a computing system (FIG. 14: CPU, memory, input/output 1401, communication means 1402, storage means such as disks 1403) allows creating in memory or on disks daylight luminescent color halftone images. Let us first describe the initialization steps (FIG. 15) performed when launching the system. The daylight luminescent color halftone rendering system is initialized by performing the steps of measuring the reflectances 1501 of the contributing classical and daylight fluorescent inks as well as their superpositions (colorants) under a reference illuminant. With the help of a color or spectral prediction model, a relationship is established between surface coverages of the inks and predicted spectrum or color. By predicting a large number of colors thanks to many combinations of surface coverages of the selected subset of inks (e.g. each ink at nominal surface coverages of 0, 0.05, 0.1, 0.15, 0.2, . . . 0.9, 0.95, 1), a data set comprising many colors is formed and its gamut given by its external hull is determined 1502, see [Cholewo and Love 1999]. A non-luminescent set of inks yields a non-luminescent gamut. A set of non-luminescent inks and at least one luminescent ink yields a luminescent color gamut. In a further step, a selected input gamut, e.g. the display gamut, or the input image gamut can be mapped into non-luminescent as well as into luminescent output target gamuts, by gamut reduction and/or gamut expansion 1503. The input gamut can also be mapped into the intersection, respectively union, of non-luminescent and luminescent gamuts (logical AND, respectively OR, operation between the two gamuts). This operation results in gamut mapping tables 1504 mapping the input gamut colors into non-luminescent, respectively luminescent output gamut colors. A last initialization step consists in building 1505, thanks to the spectral or color prediction model, the color separation table(s) indicating for each color within a grid of the selected color space (e.g. CIELAB) the amounts of inks, or in terms of nominal surface coverages, the surface coverages of the selected subsets of inks allowing to print that color under the reference illuminant. Once the system is initialized, actual luminescent color images can be synthesized by the software and sent to the printer (FIG. 16). This may be carried out by the following steps. An automatic or an operator driven procedure enable defining the original input color image 1601 as well as, if desired, the contents, layouts and reference illuminants of the hidden messages 1602. The target output color image is generated by determining at each output location the corresponding original input image color, by performing the gamut mapping into the desired target output gamut (non-luminescent gamut, luminescent gamut, intersection or union between luminescent and non-luminescent gamuts) through access of the gamut mapping table, and by determining the surface coverages of the inks to be printed at the current output image location, see 1603. These surface coverages are halftoned and the ink separation layers are sent to the printer, used to create the offset plates for offset printing or the cylinders for gravure printing. In case of creation of luminescent enhanced color images (Application VI above), the initialization steps are the same and the synthesizing steps may comprise the definition of a delta map 1605 specifying at each output image location a gamut expansion limitation factor.

Computing System for Synthesizing Daylight Luminescent Color Halftone Images

Figure 17:
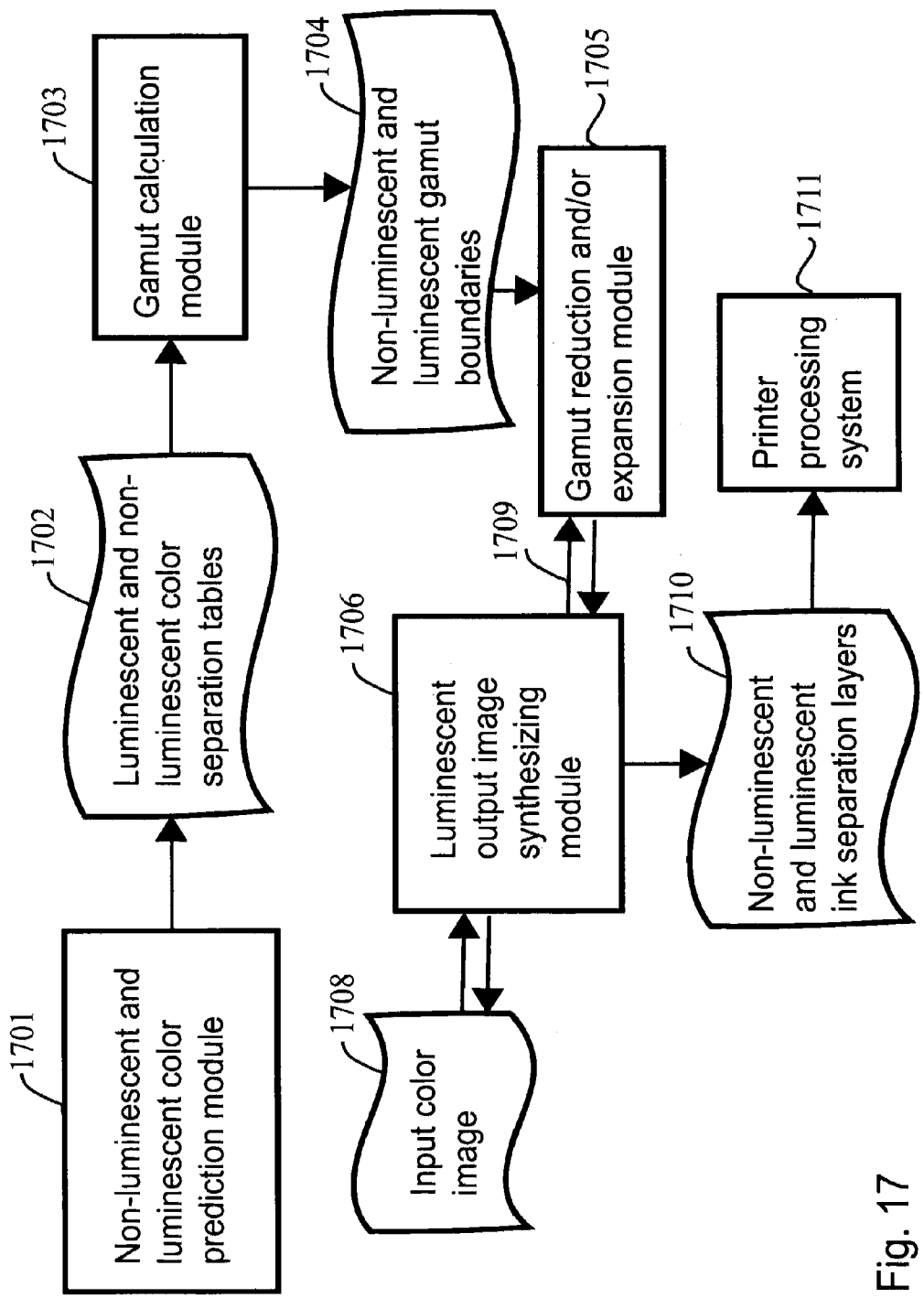
FIG. 17 shows the interacting software modules of a computing system operable for synthesizing daylight luminescent color halftone images.

A computing system for synthesizing daylight luminescent color halftone images comprises a number of software modules, simply called "modules". At system initialization time, a non-luminescent and luminescent color (or spectral) prediction module (FIG. 17, 1701) establishes the relationship between surface coverages of the selected subsets of inks and resulting colors by creating color separation tables 1702 for luminescent and non-luminescent subsets of inks. A gamut calculation module 1703 computes the boundaries 1704 of the gamuts of the selected subsets of inks by relying on the colors produced by the color prediction module. A gamut reduction and expansion module 1705 performs the gamut mapping (gamut expansion and/or reduction) of the input gamut onto the non-luminescent, the luminescent, the intersection or the union between non-luminescent and luminescent output gamuts. At output image synthesizing time, a luminescent output image synthesizing module 1706 scans the locations of the output image, locates the corresponding locations within the original input color image 1708, gets that original colors, calls 1709 the gamut reduction and expansion module in order to map the input gamut colors into the non-luminescent gamut colors, into the luminescent gamut colors or into corresponding colors at the intersection or the union of these two gamuts, determines the surface coverages of the non-luminescent and/or luminescent ink subsets, performs the halftoning and sends the resulting non-luminescent and luminescent ink separation layers 1710 for further processing to a printer processing system 1711, i.e. either directly to the printer, or to the imaging device responsible for producing the supports required for printing (offset plates for offset, cylinders for gravure printing or flexo, screens for screen printing, etc.).

Authenticating a Valuable Item by a Human Being or by an Apparatus

Figure 7B:
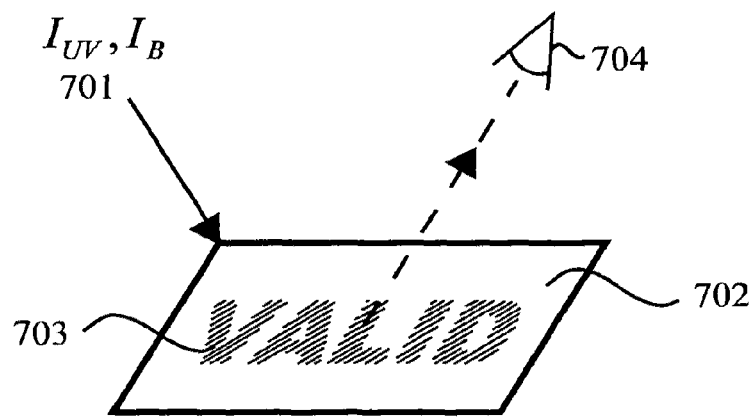

The authentication of a valuable item can be carried out by a human being, for example the person verifying the identity of the passengers embarking on an airplane or the customer buying a valuable item such as a watch. In this case, the person verifying the valuable item's partly luminescent halftone color image will first view it (FIG. 7A, 704 represents a human eye) under the reference illuminant $I_{Ref}$(FIG. 7A, 700) hiding the message (705) and then under an illuminant different from the reference illuminant (FIG. 7B, 701). The person will verify that the message is indeed hidden (705) under the reference illuminant and appears correctly (703) under a different illuminant (701). If several authentication levels are present (e.g. by hiding different messages under different reference illuminants), the valuable item may be viewed under several different illuminations, with always one illumination hiding one of the hidden messages.

The authentication of the valuable item may also be carried out by an apparatus, which (a) projects a reference illuminant light source onto the valuable item's partly luminescent color image and acquires with an acquisition device (e.g. camera, multi-channel sensor array) an image of that printed color image under the reference illuminant, (b) projects an illuminant different from the reference illuminant (e.g. a different white light source, a UV light or a colored illuminant) onto the partly luminescent color image, acquires with the acquisition device the corresponding partly reflective partly emissive image, and (c) processes the partly reflective partly luminescent image and extracts the image parts exhibiting the luminescent behavior corresponding to the property of the luminescent ink present within the subset of inks used to halftone these image parts. This apparatus then compares the extracted luminescent image parts with previously registered image parts and according to matching techniques known in the art, decides if the extracted luminescent image parts match the previously registered image parts or not. If a match is found, the valuable item incorporating the partly luminescent color halftone image is labeled as authentic.

Figure 18A:
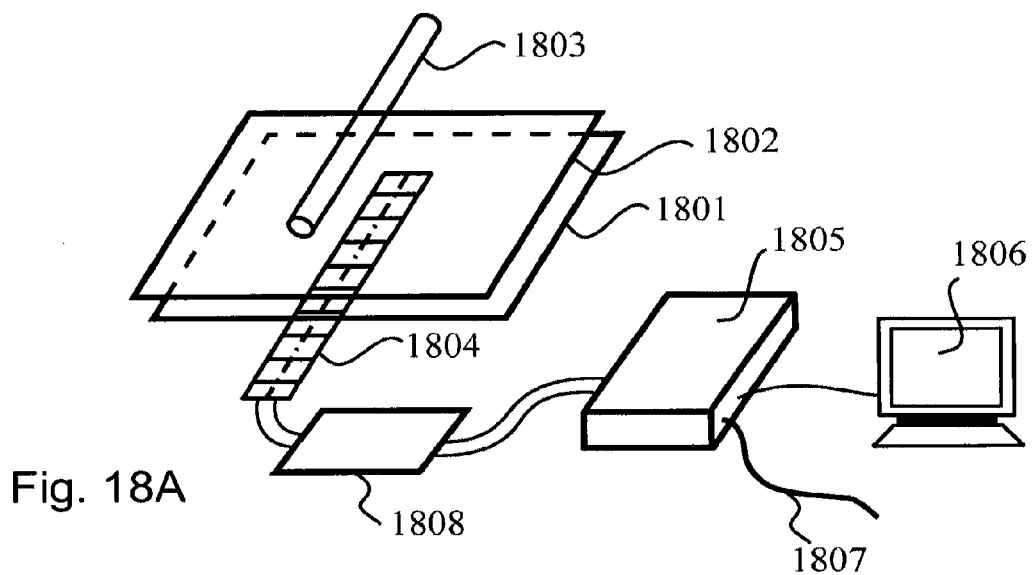
FIG. 18A shows an example of a computer-based authenticating apparatus working in transmission mode and FIG. 18B shows another example of a computer-based authenticating apparatus working in reflection mode.

An example of such a computer-based authenticating apparatus is given in FIG. 18A. This apparatus is appropriate for authenticating non-opaque documents by transmittance measurements. It comprises a reference illuminant 1803 (e.g. white light source), an optional filtering layer 1802 for modifying the spectral distribution of the light source, the luminescent transmissive color image 1801 on the valuable item to be authentified, the multi-channel sensor array 1804 and its electronics 1808 as well as a computing system 1805 storing in its memory the images acquired by the multi-channel sensor array. The computing system may also incorporate a display indicating if the valuable item being scanned is authentic or not. In addition, as an option the computing system may be connected to the Internet 1807 in order to validate that the acquired images from the scanned valuable item are valid.

Figure 18B:
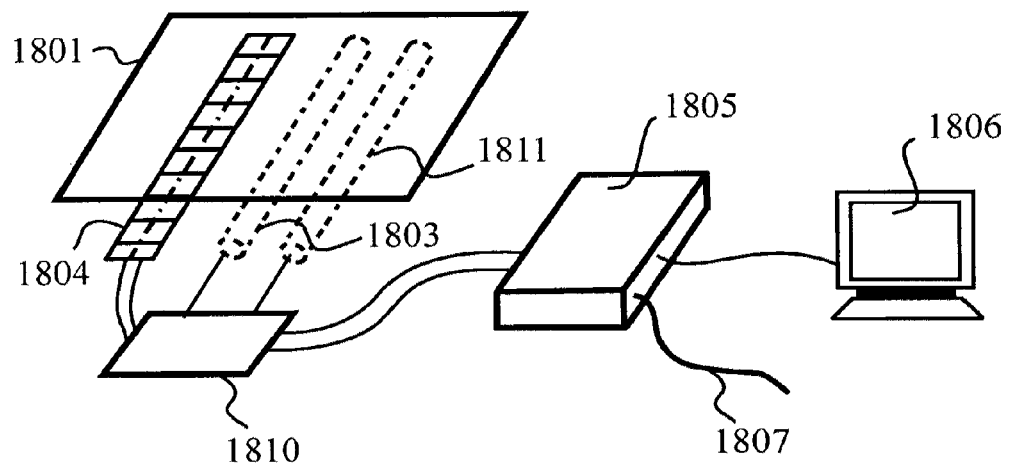

In FIG. 18B, a variant of this apparatus is given for scanning documents in reflective mode. Here, there is a first light source 1803 with the reference illuminant and a second light source 1811 with an illuminant different from the reference illuminant, for example a UV illuminant (black light) or a colored illuminant (e.g. blue light). Here also, there is a multi-channel sensor array 1804 and its electronics 1810, and a computing system 1805 storing in its memory the images acquired by the multi-channel sensor array.

Let us give an example of how such an apparatus works. The apparatus scans the valuable item 1801 by displacing the valuable item in respect to the light sources and multi-channel sensor array. There is a scan of the valuable item under the reference illuminant and a scan of the valuable item under an illuminant different from the reference illuminant. In reflective mode, it is possible to perform the two scans within a single displacement by alternately illuminating with the reference illuminant and with a non-reference illuminant. The scan performed with the reference illuminant generates the smooth output image visible under normal light and the scan performed with the non-reference illuminant generates an image where the parts generated with luminescent inks stand out. Both images are scanned multi-channel images, for example with blue (wavelength range 400 nm-500 nm), green (wavelength range 500 nm-570 nm), red (wavelength range 570 nm-730 nm) channels. If the non-reference illuminant is a UV light (black light), the multi-channel sensor will directly acquire the emission colors present in the image and be able to compare it with a previously registered emissive image by applying image matching techniques. The non-reference illuminant can also be a white light, a blue light or a green light. In the case of a white light different from the reference illuminant, classical image segmentation methods may allow to extract the luminescent image parts. In the case of blue light, image parts with yellow and magenta luminescent inks will stand out. These image parts can be compared with stored image parts for the purpose of document authentication.

Second Level Authentication

This second level authentication requires an enlarging device such as an enlarging glass or a microscope, possibly connected to an image acquisition device. A first test consists in authenticating the halftone of the luminescent color image under daylight and a second test consists in authenticating the halftone of the luminescent color image under UV light or colored light, by making use of a microscope and possibly of a UV, respectively colored light source. Under normal light, the luminescent image halftone is formed by the ink dots of the different luminescent and non-luminescent inks. Such a halftone located within a specific small region of a luminescent color image can be produced and registered as original halftone image on a Web server. The registered original halftone image can be compared with the printed actual halftone image obtained by enlargement of the same small region of the luminescent color halftone image under normal light. If the registered and the actual halftone images are substantially similar, the first test is passed. The second test consists in examining a specific region of the luminescent image halftone under UV, respectively colored light, under a microscope. Here the apparent halftone (enlarged excitation trace halftone image) should be formed by the partly luminescent ink dots. A previously registered excitation trace halftone image is compared with the printed actual excitation trace halftone image of the same small region of the luminescent color halftone image under UV, respectively colored light: If the registered excitation trace halftone image and the actual excitation trace halftone image are substantially similar, the second test is passed. Passing these two tests is an additional indication that the valuable item incorporating the luminescent color image halftone is authentic.

Illustration of the Counterfeit Prevention Properties of the Invented Multi-Ink Daylight Luminescent Color Halftone Image Synthesis Capabilities In order to illustrate the counterfeit prevention properties of the presented daylight luminescent image synthesis capabilities, let us present an example of a specific color printed with a non-luminescent set of classical cyan, magenta and yellow inks and the same color printed with a luminescent set of classical cyan, daylight luminescent magenta and daylight luminescent yellow inks. FIGS. 19A, 19C and 19E show an enlargement of respectively the cyan, magenta and yellow layers of a non-luminescent $\{c,m,y\}$ halftone and FIGS. 19B, 19D and 19F show an enlargement of respectively the cyan, luminescent magenta and luminescent yellow separation layers of the luminescent $\{c,m_F,y_F\}$ halftone producing the same color as the non-luminescent $\{c,m,y\}$ halftone, as created in memory before printing. Clearly, for the same color, the non-luminescent set of inks requires much less ink surface coverages than the luminescent set of inks. This indicates that a counterfeiter simply replacing non-luminescent inks by luminescent inks would not be able to create with the luminescent inks a faithful color reproduction of an input color image.

The invention claimed is:

1. A computer-based method for producing a printed authenticable daylight luminescent color halftone image, comprising the steps of
   (a) selecting a luminescent set of inks comprising at least one daylight luminescent ink, selecting a non-luminescent set of inks comprising only non-luminescent inks, forming with said luminescent set of inks a luminescent gamut and forming with said non-luminescent set of inks a non-luminescent gamut;
   (b) selecting an output gamut from the group of (i) intersection of said non-luminescent and luminescent gamuts and (ii) union of said non-luminescent and luminescent gamuts;
   (c) mapping by computation the gamut of input image colors onto said output gamut by applying a gamut mapping step selected from the set of gamut expansion and gamut reduction;
   (d) under a reference illuminant, establishing by computation a color to surface coverage mapping between the gamut mapped input image colors and surface coverages of inks belonging to said luminescent set of inks;
   (e) relying on said color to surface coverage mapping, separating by computation the gamut mapped input image colors into ink layer color separations of said luminescent set of inks;
   (f) halftoning and printing said ink layer color separations, thereby obtaining said printed authenticable daylight luminescent color halftone image;
   where said intersection of the non-luminescent and luminescent gamuts enables hiding a message within said authenticable daylight luminescent color halftone image;
   where said union of the non-luminescent and luminescent gamuts forms a wide gamut enabling reproducing more faithfully said input image colors;
   where said daylight luminescent color halftone image is authenticated by examining its excitation trace image under an illuminant active within its excitation wavelength range and by comparing it with a previously registered excitation trace image.

2. The method of claim 1, where said output gamut is formed by said intersection of the non-luminescent and luminescent gamuts; where a message is hidden under a reference illuminant within the daylight luminescent color halftone image by printing with one of said two selected sets of inks within areas of said message and with the other of said two selected sets of inks outside areas of said message and where the message is revealed under an illuminant different from the reference illuminant.

3. The method of claim 2, where said message is a first message printed with said luminescent set of inks so as to be hidden under a first reference illuminant and where an additional second message is printed with said luminescent set of inks so as to be hidden under a second reference illuminant and where said first message is revealed under the second reference illuminant and said second message is revealed under the first reference illuminant.

4. The method of claim 1, where three sets of inks are selected, the first two of these three sets comprising each at least one luminescent ink, where a first message is hidden under a first reference illuminant within the resulting luminescent color halftone image by printing with the first of the three sets of inks within the first message areas, where a second message is hidden under a second reference illuminant within the resulting luminescent color halftone image by printing with the second of the three sets of inks within the second message area, where the messages are revealed under an illuminant different from their reference illuminant and where their excitation trace images can be checked and compared with previously registered excitation trace images.

5. The method of claim 1, where three sets of inks are selected, the first two of these three sets comprising each at least one luminescent ink, where a message is hidden under a reference illuminant by printing said message by spatially interpolating between said first two of said three sets of inks, where the message is revealed under an illuminant different from the reference illuminant and where the excitation trace image displays colors interpolating between excitation trace image colors that the luminescent color halftone image shows when printed with the first set of inks and excitation trace image colors that the luminescent color halftone image shows when printed with the second set of inks.

6. The method of claim 1, where said printed daylight luminescent color halftone image is a wide gamut image reproducing in a more faithful manner the colors of the input image, where a non-luminescent set of inks is also selected, where the ink layer color separation with the non-luminescent set of inks is performed if the input color is located only within the gamut of said non-luminescent set of inks and where the ink layer color separation with the luminescent set of inks is performed if said input color is located only within the gamut of said luminescent set of inks.

7. The method of claim 1, where said printed daylight luminescent color halftone image is a luminescent enhanced color image and where the gamut mapping of said input image colors onto said output gamut comprises gamut expansion.

8. The method of claim 7, where gamut expansion is applied only to parts of the input image, where said parts are printed with said luminescent set of inks, where, as a result of gamut expansion and printing with said luminescent set of inks, said parts stand out and catch the attention of the observer.

9. The method of claim 8, where gamut expansion is image dependent and controlled by deltamap values specifying location dependent gamut expansion limitation factors.

10. a computer system for synthesizing a wide gamut daylight luminescent color halftone output image comprising:
    a processor;
    memory;
    a communication interface;

where software running on said computer system comprises
a color prediction module establishing a relationship between surface coverage of selected sets of inks and resulting colors,
a gamut calculation module computing the boundaries of the gamuts of the selected sets of inks,
a gamut reduction and expansion module performing the mapping of an input image gamut colors into an output gamut selected from non-luminescent gamut, luminescent gamut, intersection of luminescent and non-luminescent output gamut, and union of luminescent and non-luminescent output gamut, and
a luminescent output image synthesizing module, where said luminescent output image synthesizing module scans location of the output image, locates corresponding locations within an original input color image, gets its original color, calls the gamut reduction and expansion module to map the input gamut image colors into the output gamut, determines surface coverage of inks which belong to said selected sets of inks, performs halftoning and sends resulting non-luminescent and luminescent ink separation layers to a printer processing system, and where said luminescent color halftone output image is, due to its wide gamut, a high quality faithful color reproduction.

11. The computer system of claim 10, where the printer processing system is selected from the group of printing system and imaging device, said printing system being operable for creating from said ink separation layers halftone ink layers on a substrate with a technology selected from the set of inkjet, electrophotography, dye diffusion, thermal transfer, photolithography, etching, coating, laser marking, laser engraving, and laser ablation technologies and said imaging device being operable for producing print supports selected from the set of offset plates for offset printing, plates for flexographic printing, cylinders for gravure printing, screens for serigraphy, and photomasks for photolithography.

12. A computer-based apparatus for authenticating a valuable item comprising a partly luminescent color halftone image printed with a set of inks with at least one luminescent ink, said computer-based apparatus comprising a reference illuminant, an illuminant different from the reference illuminant, a multi-sensor acquisition device and a computing system, where the reference illuminant illuminates the partly luminescent color halftone image and the multi-sensor acquisition device acquires a corresponding reference illuminant sampled image, where an illuminant different from the reference illuminant illuminates the partly luminescent color halftone image and the multi-sensor acquisition device acquires a corresponding non-reference illuminant sampled image, where the computing system processes the acquired non-reference illuminant sampled image, extracts the luminescent image parts, compares them with previously registered luminescent image parts and accordingly decides if the valuable item is authentic.

13. The apparatus of claim 12, where the valuable item is an item selected from the set of banknotes, checks, trust papers, identification cards, passports, travel documents, tickets, diploma, business documents, bank documents, tracing documents, medical drug packages, commercial art, fashion articles, watches, clocks, bottles of perfumes, body care liquids, alcoholic drinks, clothes, attached labels.

14. The apparatus of claim 12 working in transmissive mode, where the reference illuminant is placed on one side of the partly luminescent color halftone image and the multi-sensor acquisition device is placed on the other side of the partly luminescent color halftone image and where the illuminant different from the reference illuminant is formed by light originating from the reference illuminant and traversing a filter modifying its spectral power distribution.

15. An authenticable daylight luminescent color halftone image printed on a valuable item whose halftones are formed by a luminescent set of inks comprising at least one daylight luminescent ink and at least one non-luminescent ink, which under daylight reproduces an original continuous tone color image and under an excitation illuminant produces an excitation trace halftone image enabling verifying the valuable item's authenticity by comparison with a previously registered excitation trace halftone image.

16. The printed daylight luminescent color halftone image of claim 15 forming a color image of improved quality, the improved quality being obtained by the larger gamut created with said luminescent set of inks.

17. The printed daylight luminescent color halftone image of claim 15 forming an enhanced color image, the enhanced color image being obtained by gamut expansion increasing the lightness and the saturation of image colors located within parts of said daylight luminescent color halftone, image.

18. The printed daylight luminescent color halftone image of claim 15 comprising a message hidden under a reference illuminant and revealed under a non-reference illuminant, thereby authenticating said valuable item.

19. The printed daylight luminescent color halftone image of claim 18, where said message is a first message hidden under said reference illuminant and where a second message is hidden under a second reference illuminant, and where said first message is revealed under said second reference illuminant and said second message is revealed under said first reference illuminant, thereby authenticating said valuable item.

20. The printed daylight luminescent color halftone image of claim 19, printed with at least two different luminescent sets of inks, each one comprising at least one daylight luminescent ink, where a first message is hidden under a reference illuminant within the resulting luminescent color halftone image by having the first luminescent set of inks printed within areas of said first message, where a second message is hidden under a reference illuminant within the resulting luminescent color halftone image by having the second luminescent set of inks printed within areas of said second message, where the messages are revealed under an illuminant different from their respective reference illuminant and where for authentication purposes the excitation trace images are checked and compared with previously registered excitation trace images.

21. The printed authenticable daylight luminescent color halftone image of claim 15, printed with at least two different luminescent sets of inks, each one comprising at least one daylight luminescent ink, where a message is hidden under a reference illuminant by having said message printed by spatially interpolating between said two luminescent sets of inks, where the messages are revealed under an illuminant different from the reference illuminant and where, for authentication purposes, the excitation trace image displays colors interpolating between excitation trace image colors that the luminescent color halftone image shows when printed with the first set of inks and excitation trace image colors that the luminescent color halftone image shows when printed with the second sot of inks.

22. The printed authenticable daylight luminescent color halftone image of claim 15, where a first part of a second level authenticity test consists in comparing a previously registered original daylight halftone image located within a first specific region of said daylight luminescent color halftone image with an enlargement of said first region of said printed daylight luminescent color halftone image, and where a second part of said authenticity test consists in comparing a previously registered original UV illuminant trace halftone image located within a second specific region of said daylight luminescent color halftone image with an enlargement of said second region of an actual UV illuminant trace halftone image of said daylight luminescent color halftone image.

23. The computer system of claim 10, where said daylight luminescent color halftone output image is authenticated by examining its excitation trace image under an illuminant active within its excitation wavelength range and by comparing it with a previously registered excitation trace image.

24. A computer-based method for producing a wide gamut daylight luminescent color halftone image, comprising the steps of
 (a) selecting a luminescent set of inks comprising at least one daylight luminescent ink and a non-luminescent set of inks comprising only non-luminescent inks;
 (b) forming with said luminescent set of inks a luminescent gamut and with said non-luminescent set of inks a non-luminescent gamut;
 (c) forming as output gamut the union of the luminescent and non-luminescent gamuts;
 (d) mapping by computation input image colors onto said output gamut by applying a gamut mapping step selected from the set of gamut expansion and gamut reduction;
 (e) under a reference illuminant, establishing by computation a color to surface coverage mapping between gamut mapped input image colors and surface coverages of inks forming said luminescent set of inks;
 (f) relying on said color to surface coverage mapping, separating by computation the gamut mapped input image colors into ink layer color separations of said luminescent set of inks;
 (g) halftoning and printing said ink layer color separations, thereby obtaining said wide-gamut daylight luminescent color halftone image;
 where said method reproduces input image colors that are outside of the gamut of colors reproducible with non-luminescent inks and is therefore able to produce higher quality faithful color reproductions, such as reproductions of art paintings for postcards, books and posters.

25. The method of claim 24, where the color separation with the non-luminescent set of inks is performed if the input color is located within the gamut of said non-luminescent set of inks and where the color separation with the luminescent set of inks is performed if said input color is located only within the gamut of said luminescent set of inks.

26. The method of claim 24, where said wide-gamut daylight luminescent color halftone image is a luminescent enhanced color image, and where said gamut mapping step comprises gamut expansion which enables colors located close to the set of colors formed by yellow, orange, red and green to be highlighted.

27. The method of claim 26, where said gamut expansion is applied only to parts of the input image; where said parts are printed with said luminescent set of inks, and where, as a result of gamut expansion and printing with said luminescent set of inks, said parts stand out and catch the attention of the observer.

28. The method of claim 27, where gamut expansion is image dependent and controlled by deltamap values specifying location dependent gamut expansion limitation factors.

29. A printed daylight luminescent color halftone image whose halftones are formed by a luminescent set of inks comprising at least one daylight luminescent ink and at least one non-luminescent ink, which under daylight reproduces an original continuous tone color image of improved quality, the improved quality being due to the luminescent gamut created with said luminescent set of inks which is larger than a non-luminescent print gamut produced with a non-luminescent set of inks and being due to gamut mapping which maps colors of the original continuous tone color image into said luminescent gamut.

30. The printed daylight luminescent color halftone image of claim 29 forming an enhanced color image, the enhanced color image being obtained by gamut expansion increasing the lightness and the saturation of image colors located within parts of said daylight luminescent color halftone image.

* * * * *